US012487964B2

(12) United States Patent
Dally

(10) Patent No.: US 12,487,964 B2
(45) Date of Patent: Dec. 2, 2025

(54) ASYNCHRONOUS ON-CHIP NETWORK

(71) Applicant: NVIDIA Corporation, Santa Clara, CA (US)

(72) Inventor: William James Dally, Incline Village, NV (US)

(73) Assignee: NVIDIA Corporation, Santa Clara, CA (US)

( * ) Notice: Subject to any disclaimer, the term of this patent is extended or adjusted under 35 U.S.C. 154(b) by 111 days.

(21) Appl. No.: 18/581,283

(22) Filed: Feb. 19, 2024

(65) Prior Publication Data

US 2025/0265221 A1 Aug. 21, 2025

(51) Int. Cl.
*G06F 15/78* (2006.01)

(52) U.S. Cl.
CPC ................................ *G06F 15/7825* (2013.01)

(58) Field of Classification Search
CPC ............................. G06F 15/7825; G06F 15/78
See application file for complete search history.

(56) References Cited

U.S. PATENT DOCUMENTS

2011/0161626 A1* 6/2011 Mangione-Smith .... H04L 47/83 712/E9.002
2015/0220470 A1* 8/2015 Chen ..................... H04L 49/109 710/105
2022/0358069 A1* 11/2022 Giaconi ................ G06F 13/385

OTHER PUBLICATIONS

Rostislav, D., et al., "An asynchronous router for multiple service levels networks on chip," 11th IEEE International Symposium on Asynchronous Circuits and Systems, IEEE, 2005.
Rostislav, D., et al., "QNoC asynchronous router," Integration 42.2 (2009): pp. 103-115.
Gill, G., et al., "A low-latency adaptive asynchronous interconnection network using bi-modal router nodes," Proceedings of the Fifth ACM/IEEE International Symposium on Networks-On-Chip, 2011.
Effiong, C., et al., "Scalable and power-efficient implementation of an asynchronous router with buffer sharing," 2017 Euromicro Conference on Digital System Design (DSD), IEEE, 2017.

(Continued)

*Primary Examiner* — Schquita D Goodwin
*Assistant Examiner* — Mehulkumar J Shah
(74) *Attorney, Agent, or Firm* — Leydig, Voit & Mayer, Ltd.

(57) ABSTRACT

An on-chip network (NoC) is a critical component of a GPU, CPU, network switch, or accelerator. The network nodes may be arranged in a two-dimensional array with each network node coupled to neighboring network nodes vertically and horizontally, with or without diagonal connections. Conventional routers within network nodes are synchronous, taking from 1-10 clock cycles to determine an output port, arbitrate between virtual and physical channels, and account for credits. In contrast, in an embodiment, transmission of a packet between network nodes often occurs in less than one clock cycle because the handshake protocol and the circuitry are not synchronized using a clock signal. When implemented using asynchronous logic, the routing delay and power are reduced. The channel latency is the minimum time needed to drive the physical traces. Such an asynchronous NoC may reduce latency by a factor of two or more compared with a synchronous NoC.

23 Claims, 20 Drawing Sheets

Die
120

Node 100 0,3 | Node 100 1,3 | Node 100 2,3 | Node 100 3,3
Node 100 0,2 | Node 100 1,2 | Node 100 2,2 | Node 100 3,2
Node 100 0,1 | Node 100 1,1 | Node 100 2,1 | Node 100 3,1
Node 100 0,0 | Node 100 1,0 | Node 100 2,0 | Node 100 3,0 y
x

(56) References Cited

OTHER PUBLICATIONS

Onizawa, N., et al., "High-throughput compact delay-insensitive asynchronous NoC router," IEEE Transactions on Computers 63.3 (2013): 637-649.
Song, W., et al., "A low latency wormhole router for asynchronous on-chip networks," 2010 15th Asia and South Pacific Design Automation Conference (ASP-DAC), IEEE, 2010.
Jiang, W., et al., "An asynchronous NoC router in a 14nm FinFET library: comparison to an industrial synchronous counterpart," Design, Automation & Test in Europe Conference & Exhibition (DATE), 2017, IEEE, 2017.
Horak, M., et al., "A low-overhead asynchronous interconnection network for GALS chip multiprocessors," IEEE Transactions on Computer-Aided Design of Integrated Circuits and Systems 30.4 (2011): 494-507.
Elhaji, M., et al., "FERONIC: flexible and extensible router implementation for diagonal mesh topology," Proceedings of the 2011 Conference on Design & Architecture for Signal & Image Processing (DASIP), IEEE, 2011.
Furhad, MD., et al., "An extended diagonal mesh topology for network-on-chip architectures," International Journal of Multimedia and Ubiquitous Engineering 10.10 (2015): 197-210.
Tang, K., et al., "Diagonal and toroidal mesh networks," IEEE Transactions on Computers 43.7 (1994): 815-826.
Sharifpour, B., et al.,. "SID-Mesh: Diagonal Mesh Topology for Silicon Interposer in 2.5 D NoC with Introducing a New Routing Algorithm," 2021 ACM/IEEE International Workshop on System Level Interconnect Prediction (SLIP), IEEE, 2021.
Saini, R.K., et al., "2D hexagonal mesh Vs 3D mesh network on a chip: A performance evaluation," International Journal of Computing and Digital Systems 4.01, 2015.

* cited by examiner

ASYNCHRONOUS ON-CHIP NETWORK

BACKGROUND

An on-chip network (NoC) is a critical component of a GPU, CPU, network switch, or accelerator. An ideal NoC routes packets with minimum latency and minimum energy. For many use cases, NoC latency directly affects system performance in a significant manner. For example, in a many-core CPU chip, the latency of the NoC adds to the latency of a memory fetch to the last-level cache (LLC) or DRAM because each fetch traverses the NoC. Conventional routers within each network node are synchronous, taking from one to ten clock cycles to determine an output port, arbitrate between virtual and physical channels, and account for credits. A solution is needed for reducing latency.

SUMMARY

An asynchronous router within network nodes of an on-chip network reduces routing latency. Conventional routers within network nodes are synchronous, taking from 1-10 clock cycles to determine an output port, arbitrate between virtual and physical channels, and account for credits. In contrast, in an embodiment, transmission of a packet between network nodes often occurs in less than one clock cycle because the handshake protocol and the circuitry are not synchronized using a clock signal. When implemented using asynchronous logic, the routing delay and power are reduced. The channel latency is the minimum time needed to drive the physical traces. Such an asynchronous NoC may reduce latency by a factor of two or more compared with a synchronous NoC.

The network nodes may be arranged in a two-dimensional array with each network node coupled to neighboring network nodes vertically and horizontally. Each network node has five input ports and five output ports (east, west, north, south, and local). In an embodiment, neighboring network nodes are also coupled diagonally, so that each network node has nine input ports and nine output ports.

In an embodiment, an on-chip network comprises a two-dimensional array of network nodes fabricated in a die, where each one of the network nodes comprises a plurality of input ports and a plurality of output ports. Each input port is configured to receive an asynchronous input signal comprising a packet that includes data and a destination address and while a request valid input signal is asserted, route the data to one output port of the plurality of output ports according to the destination address. Each input port is further configured to asynchronously assert a route request signal input to the one output port for transmitting the packet and, in response to determining that the packet is accepted, assert an acknowledge output signal. Each output port is configured to receive route request input signals from at least two input ports of the plurality of input ports and select the packet provided by one of the at least two input ports for which the route request signal input is asserted as a selected packet. Each output port is further configured to asynchronously output an output signal comprising the selected packet, assert an output request valid signal and, in response to assertion of an acknowledge input, negate the output request valid signal and assert a route acknowledge output signal to the one of the at least two input ports indicating acceptance of the packet for transmission.

BRIEF DESCRIPTION OF THE DRAWINGS

The present systems and methods for an on-chip network (NoC) with diagonal channels and an asynchronous NoC are described in detail below with reference to the attached drawing figures, wherein.

DETAILED DESCRIPTION

Systems and methods are disclosed related to an asynchronous on-chip network (NoC). NoC latency and energy is reduced by fabricating wires (conductive paths) on an integrated circuit die not only horizontally and vertically, but also diagonally between network nodes of a mesh network. The diagonal wires may be fabricated on separate routing layers than the horizontal and vertical wires. When the network nodes are arranged in a two-dimensional array, the diagonal wires reduce the latency of an example packet transfer from a network node at position (0,0) in the array to another network node at position (3,3) to three diagonal hops compared with three horizontal and three vertical hops without diagonal wires, reducing the number of router delays to four compared with seven. Channel delays are reduced from six single unit delays to three 1.4 unit delays (4.2 unit delays). Overall, the latency and energy of an on-chip network may be reduced by about 40% for diagonal traffic and about 20% on average.

Figure 1A:
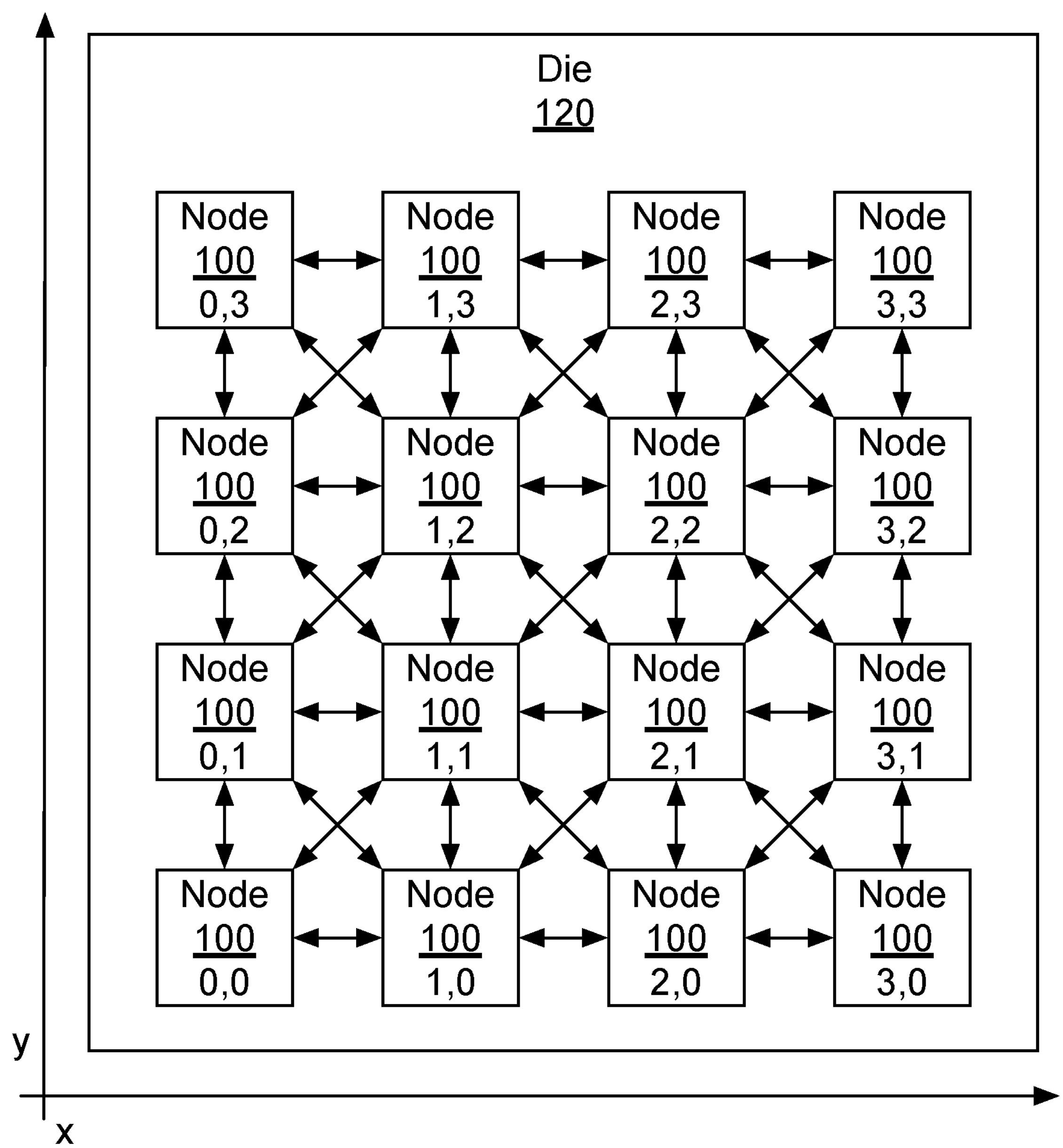
FIG. 1A is a conceptual diagram of a two-dimensional array of network nodes fabricated in a die, in accordance with an embodiment.

FIG. 1A is a conceptual diagram of a two-dimensional array of network nodes 100 fabricated in a die 120, in accordance with an embodiment. Each of the network nodes 100 is annotated with (x,y) coordinates according to an x-y grid of the two-dimensional array. The coordinates define a position in the array. The array is a 4×4 mesh network, however other array sizes are possible including N×N and N×M. A packet transfer from the network node 100 at position (0,0) to the network node 100 at position (2,2) requires two diagonal hops. In contrast, a conventional NoC without diagonal connections requires two vertical and two horizontal hops, for a total of four hops. Each network node 100 comprises a router that is directly coupled via a local input port and a local output port to a client (processing core of a CPU or GPU). In an embodiment, the diagonal traces are implemented as straight wire routes without horizontal or vertical segments. In an embodiment, the diagonal traces are implemented as zig-zag (stairstep or piecewise) Manhattan traces within a single layer or within two or more layers which incur longer delays from the wire route compared with straight diagonal traces. However, the zig-zag traces do retain the advantage of avoiding control logic delays by typically reducing the number of network nodes 100 that are traversed.

The term, conductive, as used herein refers to electrical conduction as part of the transmission of an electrical signal connected as electrical signals (e.g., digital or analog signals) in a device (e.g., an integrated circuit device), such as a NoC, as familiar to those skilled in the pertinent art. The terms, interconnected or connected, as used herein, refer to electrical connection features between the component structures of the interconnection structures for the transmission of the electrical signals. In some such embodiments, the electrical signals are data-carrying signals or return path signals. The term return path signal, as used herein, refers to any voltage as part of the return path, e.g., a ground connection, or a supply connection (e.g., a voltage applied to drain, VDD), which is generally represented as "GND". One skilled in the art will understand that a "conductive path" may include repeater circuits, such as inverters or buffers, to amplify the signal along the path.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
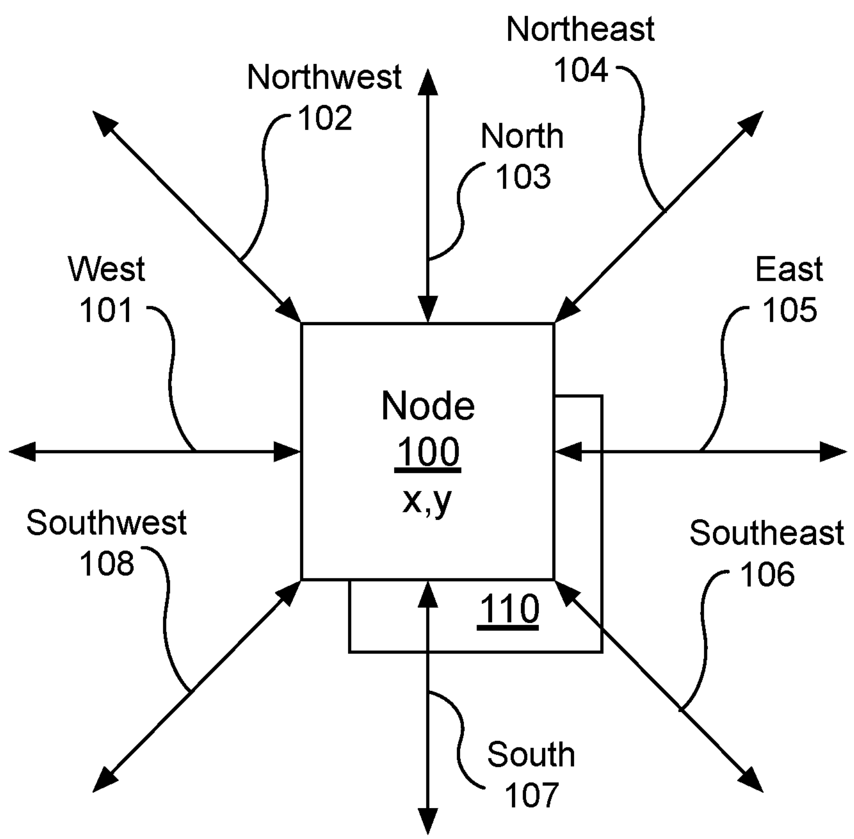
FIG. 1B is a conceptual diagram of a network node shown in FIG. 1A, in accordance with an embodiment.

FIG. 1B is a conceptual diagram of a network node 100 shown in FIG. 1A, in accordance with an embodiment. In an embodiment, the network node 100 is stacked on a client 110 (processing core of a CPU or GPU). The client 110 and network node 100 may be integrated into the die 120 or fabricated on separate die. In an embodiment, the client 110 includes memory that may be integrated with the processing core or stacked with the client 110.

Network nodes 100 have horizontal conductive paths directly coupling each horizontally aligned adjacent pair of the network nodes 100 in the array for transmitting packets. For example, each horizontally aligned adjacent pair of network nodes 100 at positions (0,2) and (1,2), positions (1,2) and (2,2), and positions (2,2) and (3,2) are directly coupled by west 101 and east 105 conductive paths. The east 105 and west 101 connections directly couple a west output port on a first network node 100 to an east input port on a horizontally adjacent second network node 100 and directly couple an east output port on the second network node 100 to a west input port on the first network node 100.

Network nodes 100 have vertical conductive paths directly coupling each vertically aligned adjacent pair of the network nodes 100 in the array for transmitting packets. For example, each vertically aligned adjacent pair of network nodes 100 at positions (1,0) and (1,1), positions (1,1) and (1,2), and positions (1,2) and (1,3) are directly coupled by north 103 and south 107 conductive paths. Similar to the west 101 and east 105 connections, the north 103 and south 107 connections directly couple a north output port on a first network node 100 to a south input port on a vertically adjacent second network node 100 and directly couple a south output port on the second network node 100 to a north input port on the first network node 100.

Network nodes 100 have diagonal conductive paths directly coupling each diagonally aligned adjacent pair of the network nodes 100 in the array for transmitting packets. For example, each diagonally aligned adjacent pair of network nodes 100 at positions (0,0) and (1,1), positions (1,1) and (2,2), and positions (2,2) and (3,3) are directly coupled by northeast 104 and southwest 108 conductive paths. In another example, in an orthogonal diagonal direction, each diagonally aligned adjacent pair of network nodes 100 at positions (0,3) and (1,2), positions (1,2) and (2,1), and positions (2,1) and (3,0) are directly coupled by northwest 102 and southeast 106 conductive paths. In an embodiment, the diagonal conductive paths directly couple each diagonally aligned adjacent pair the network nodes 100 in a first direction and a second direction that is orthogonal to the first direction, as shown in FIG. 1A. In an embodiment, the diagonal conductive paths directly couple each diagonally aligned adjacent pair the network nodes 100 in either the first direction or the second direction. In an embodiment, one or more of the diagonal conductive paths shown in FIG. 1A are omitted. In an embodiment, the diagonal conductive paths directly couple at least one diagonally aligned pair of the network nodes 100 in the array, where the network nodes 100 in the pair are not adjacent. For example, the diagonal conductive paths may directly couple a first diagonally aligned pair of the network nodes 100 at positions (1,2) and (3,0) or a second diagonally aligned pair of the network nodes 100 at positions (3,3) and (0,0).

Figure 1C:
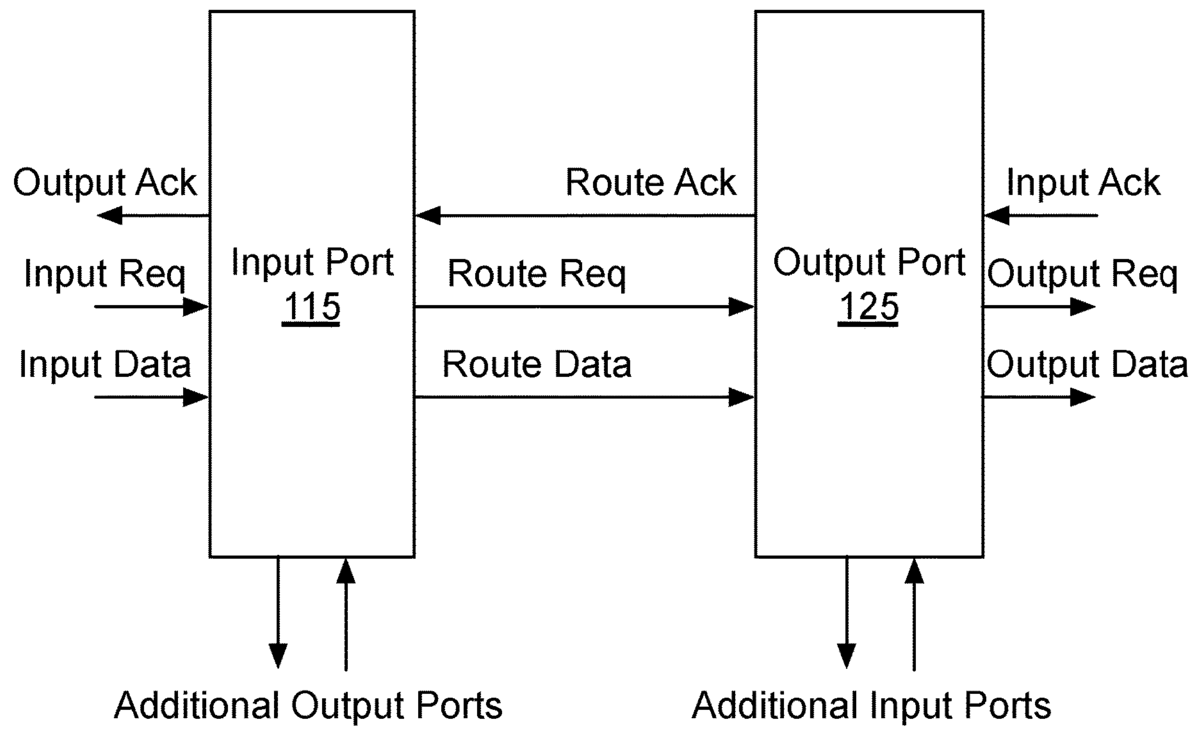
FIG. 1C is a block diagram of an input port and an output port of the network node, in accordance with an embodiment.
Figure 1C:
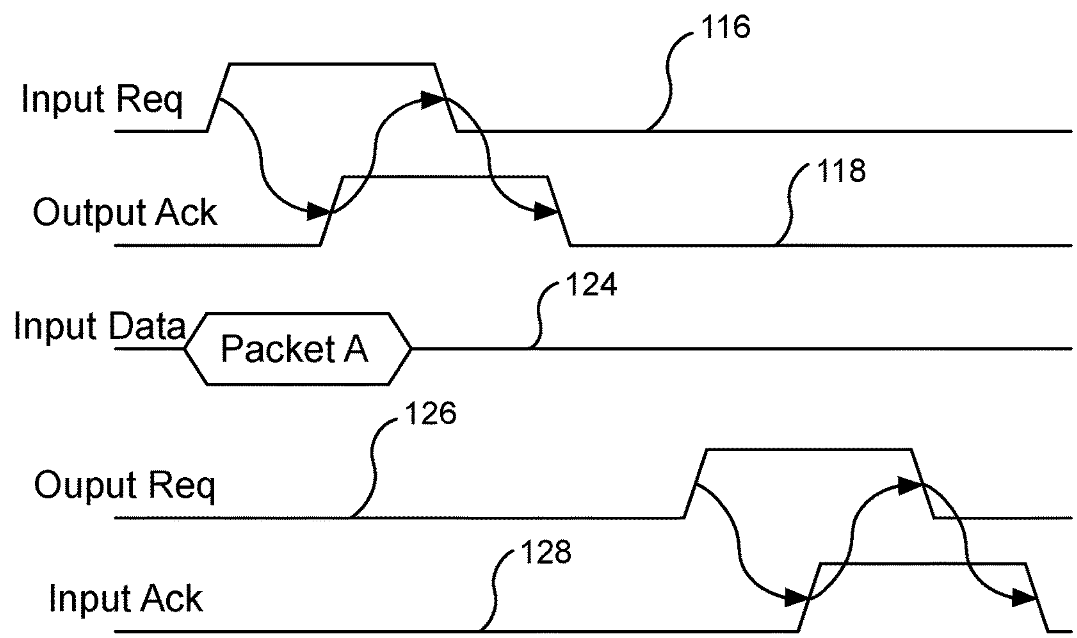

Similar to the other connections, the northeast 104 and southwest 108 connections directly couple a northeast output port on a first network node 100 to a southwest input port on a diagonally adjacent second network node 100 and directly couple a southwest output port on the second network node 100 to a northeast input port on the first network node 100. Also, the northwest 104 and southeast 106 connections directly couple a northwest output port on a first network node 100 to a southeast input port on a diagonally adjacent second network node 100 and directly couple a southeast output port on the second network node 100 to a northwest input port on the first network node 100. In addition to the eight bidirectional connections to adjacent network nodes 100 in the north (N), northeast (NE), east (E), southeast (SE), south (S), southwest (SW), west (W), and northwest (NW) directions, each network node 100 also has a ninth bidirectional conductive path (not shown) directly coupling the network node 100 to a local input port and a local output port for communication with the client 110. FIG. 1C is a block diagram of an input port 115 and an output port 125 of the network node 100, in accordance with an embodiment. The input port 115 receives input requests comprising an asserted input req (request) signal and input data (packet) from another network node 100. The input port 115 asserts an output ack (acknowledge) signal when the packet is accepted for transmission. The input port 115 is coupled to the output port 125 and additional output ports, including a local output port. The input port 115 examines the packet to determine which output port 125 the request should be routed to and transmits a route request including the packet (route data) to the output port 125 and asserts a route req signal. When the route request is accepted by the output port 125, the output port 125 asserts a route ack signal. When the acknowledge (ack) signal is asserted, the packet has been copied into a downstream storage element and the input port 115 is free to change the route data signals that were holding the packet. Note that the output port 125 receives route requests from additional input ports, including the local input port, and arbitrates between the route requests. The output port 125 drives output requests comprising an asserted output req signal and packet (output data) to transmit the packet to another network node 100. The output port 125 receives an input ack signal that is asserted when the output request is accepted and the input data (packet) no longer needs to be driven. The input ack signal is propagated backwards through circuitry to generate the route ack output from the output port 125 to the input port 115. Similarly, the input req signal is propagated forward through circuitry to generate the route req output from the input port 115 to the output port 125.

Waveforms 116 and 118 illustrate an example four-phase handshake where the output ack signal is asserted by the input port 115 in response to assertion of the input req signal. Packet A is driven onto the input data before or at the time that input req signal is asserted, as shown by waveform 124, so that the input data is valid when the input req signal is asserted. The input req signal is negated in response to assertion of the output ack signal. In an embodiment, as illustrated by the waveform 124, packet A does not need to be driven onto the input data after the output ack signal is asserted. In an embodiment, packet A is driven onto the input data until the input req signal is negated. A new input request may be presented by asserting the input req signal. The output ack signal is negated in response to negation of the input req signal. In an embodiment, when the input port 115 is not capable of storing the packet to be transmitted, assertion of the output ack may be delayed until after a route ack is asserted by the output port 125, indicating acceptance of the route request. Waveforms 126 and 128 illustrate an example four-phase handshake where the input ack signal is asserted in response to assertion of the output req signal by the output port 125. A similar four-phase handshake may also be implemented for the route ack and route req signals. In an embodiment, a signal is a binary zero (FALSE) when asserted and a binary one (TRUE) when negated. In another embodiment, a signal is a binary one when asserted and a binary zero when negated.

It should be understood that the die 120, network node 100, input port 115, output port 125, and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the die 120 is within the scope and spirit of embodiments of the present disclosure.

Although each network node 100 has nine input ports 115 and nine output ports 125, it is not necessary to route each input port 115 to every one of the output ports 125. A routing algorithm prioritizes routing in a diagonal direction before the horizontal and vertical directions. A packet is routed diagonally until either the horizontal and/or vertical destination coordinate ($x_d$, $y_d$) equals the horizontal and/or vertical coordinate ($x_c$, $y_c$), respectively, of the network node 100 currently processing the packet (current network node). Once either the horizontal and/or vertical destination coordinate of the packet equals the horizontal and/or vertical coordinate, respectively, the packet is then routed either locally, horizontally, or vertically to the destination network node 100. The routing algorithm reduces the circuitry and energy compared with providing routing connections from each input port 115 to every one of the output ports 125.

Figure 1D:
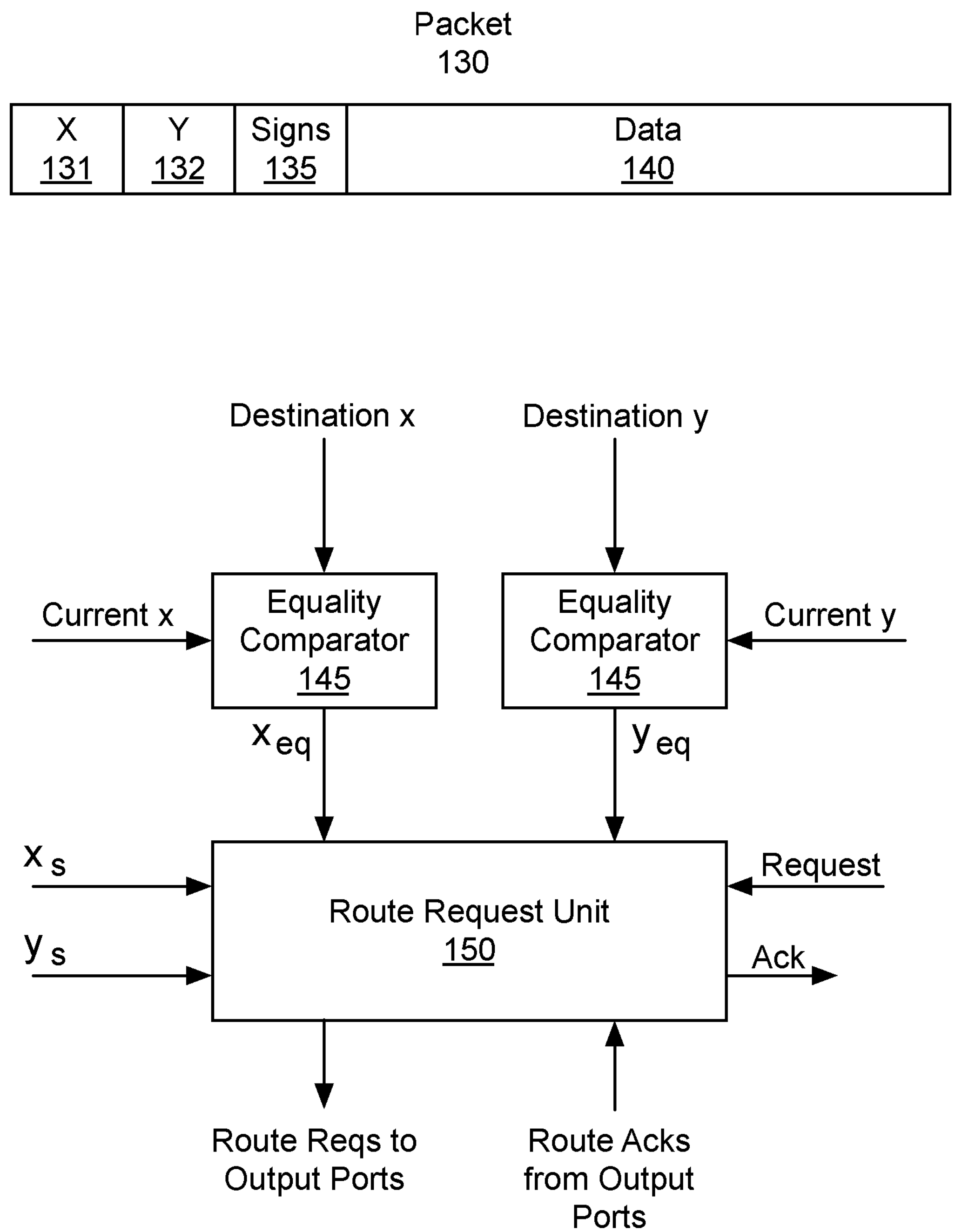
FIG. 1D illustrates a packet and block diagram for computing a route request, in accordance with an embodiment.

FIG. 1D illustrates a packet 130 and block diagram for computing a route request, in accordance with an embodiment. The packet 130 includes destination coordinates x 131 ($x_d$) and y 132 ($y_d$), and data (payload). In an embodiment, the packet 130 also includes signs 135, which are x and y sign bits ($x_s$ and $y_s$) resulting from a comparison between each of the x and y coordinates of the destination and source network nodes 100. In an embodiment, the sign bit is negated when the sign of the difference between the coordinates of the destination and source network nodes 100 is positive (+). In an embodiment, a portion of the packet 130 containing the destination coordinates x 131 and y 132 and the signs 135 comprises a header. The source network node 100 receives the packet at the local input port 115 and the packet is transmitted to the destination network node 100 for output to the local output port 125.

Routing may be simplified by the current network node 100 checking for equality between the respective coordinates of the current network node 100 and the destination network node 100, where a bit $x_{eq}$ is asserted when the x coordinates are equal and a bit $y_{eq}$ is asserted when the y coordinates are equal. An equality comparator 145 asserts an output bit when its two inputs are equal. In an embodiment, the equality unit 145 is implemented as a bit-wise comparison that asserts the output bit for a coordinate when each bit of the destination coordinate equals a corresponding bit of the current network node 100 coordinate (just two AND gates since the current network node 100 coordinates are constant). In an embodiment, the signs 135 are not included in the packet 130 and the current network node 100 computes the signs 135 for differences between the respective coordinates of the destination network node 100 and the current network node 100. In an embodiment, the equality and sign bits are used by a route request unit 150 in the current network node 100 to route the packet 135 from an input port 115 to an output port 125. In an example embodiment, the route request unit 150 receives the signs 135, the equal bits ($x_{eq}$, $y_{eq}$), and a request signal and generates a route request for one of the output ports 125. In an embodiment, the route request consists of the route req handshake signal and when the output port 125 is configured to receive route requests from multiple input ports 115, a separate route req signal is received from each one of the multiple input ports 115. In an embodiment, the route request comprises the route req handshake signal and the packet header. In an embodiment, the route request comprises the route req handshake signal and the packet 130. When the output port 125 indicates that the route request is accepted by asserting the route ack handshake signal, the route request unit 150 asserts the ack signal.

A preferable routing algorithm is diagonal first dimension order. If a location ($x_e$, $y_e$) of the current network node 100 differs in both dimensions (x and y) from the destination coordinates ($x_d$, $y_d$) for the packet 130, the route request unit 150 determines a diagonal route that brings the packet 130 closer to the destination in both dimensions. When the signs 135 are not included in the packet 135, the route request unit 150 may compare the current and destination coordinates ($x_d-x_c$, $y_d-y_c$) to compute the signs 135. When the signs 135 are (+,+) the packet 130 is routed to the channel associated with the NE output port 125. The route request unit 150 routes the packet 130 to the channel associated with the SE output port 125 when the signs 135 are (+,−). The route request unit 150 routes the packet 130 to the channel associated with the NW output port 125 when the signs 135 are (−,+). The route request unit 150 routes the packet 130 to the channel associated with the SW output port 125 when the signs 135 are (−,−). Once the packet 130 has been routed to the network node 100 where the coordinates of the current network node 100 and the destination coordinates differ in only one dimension (either x or y), the packet 130 is routed in the direction associated with the dimension and associated sign. For example, when $y_{eq}$ is asserted indicating that the y coordinates are equal, the packet 130 is routed to the channel associated with the E output port 125 when the $x_s$ is + and is routed to the channel associated with the W output port 125 when the $x_s$ is −. Similarly, when $x_{eq}$ is asserted indicating that the x coordinates are equal, the packet 130 is routed to the channel associated with the N output port 125 when the $y_s$ is + and is routed to the channel associated with the S output port 125 when the $y_s$ is −. When the packet 130 arrives at the destination network node 100, the coordinates of the current network node 100 and the destination coordinates are both equal, $x_{eq}$ and $y_{eq}$ are both asserted, and the packet 130 is routed to the channel associated with the local output port 125.

Given the diagonal first routing algorithm, each diagonal output port 125 only needs to receive route requests from two input ports 115—one from the local input port 115 and one from a complementary diagonal input port 115 (i.e., the NW output port 125 accepts packets 130 from the local input port 115 and the SE input port 115). Each horizontal output channel associated with either the E or W output ports 125 only accepts packets 130 from the local input port 125, the complementary horizontal input port 115, and the two diagonal input ports 115 that share the complementary horizontal direction. Each vertical output channel associated with either the N or S output ports 125 only accepts packets 130 from the local input port 125, the complementary vertical input port 115, and the two diagonal input ports 115 that share the complementary vertical direction. The local output port can accept packets from all six input ports. TABLE 1 below summarizes the connections from input ports 115 to output ports 125.

TABLE 1

Input ports connected to each output port

| Output Port | Input Ports Connected |
|---|---|
| SE | L, NW |
| NE | L, SW |
| SW | L, NE |
| NW | L, SE |
| E | L, W, NW, SW |
| W | L, E, NE, SE |
| N | L, S, SW, SE |
| S | L, N, NW, NE |
| L | L, SE, NE, SW, NW, E, W, N, S |

Because most output ports 125 have a small number of inputs, four output ports 125 with two inputs and four output ports 125 with four inputs, the routing logic can be efficient in terms of circuitry footprint, power, and speed. TABLE 2 is an inversion of TABLE 1, listing the output ports 125 that are connected to each input port 115.

TABLE 2

Output ports connected to each input port

| Input Port | Output Ports Connected |
|---|---|
| L | L, SE, NE, SW, NW, E, W, N, S |
| NE | SW, S, W, L |
| SW | NE, N, E, L |
| NW | SE, S, E, L |
| SE | NW, N, W, L |
| E | W, L |
| W | E, L |
| N | S, L |
| S | N, L |

Routing is simplified if the signs 135, sign bits of the difference ($x_s$, $y_s$)=($x_d-x_e$, $y_d-y_e$) are computed at the source network node 100 and transmitted in the packet 130 along with the destination coordinates x 131 and y 132, ($x_d$, $y_d$). Then the output port 125 can be selected quickly by the route request unit 150 with ($x_{eq}$, $y_{eq}$) provided by the equality units 145. In an embodiment, only a few logic gates are needed to select the correct output port 125 given ($x_{eq}$, $y_{eq}$) and ($x_s$, $y_s$).

Except for the local input port 115, the signs 135 are not needed by the route request unit 150 to determine the output port 125. For the four-output input ports 115 (NE, SW, NW, and SE), $\sim x_{eq} \wedge \sim y_{eq}$ (~ is invert and $\wedge$ is an AND operation) selects the complementary diagonal output port 125, $\sim x_{eq} \wedge y_{eq}$ selects the complementary horizontal output port 125 (e.g., E output port 125 is selected for the NW input port 115), and $x_{eq} \wedge \sim y_{eq}$ selects the complementary vertical output port 125 (e.g., S output port 125 is selected for the NW input port 115). When both coordinates are equal, $x_{eq} \wedge y_{eq}$ the local output port 125 is selected. For the two-output input ports 115 (E, W, N, and S), only one of the two AND gates is needed. For a horizontal direction input port 115, for example $x_{eq}$ selects between continuing in the horizontal direction or exiting at the local output port 125.

Figure 1E:
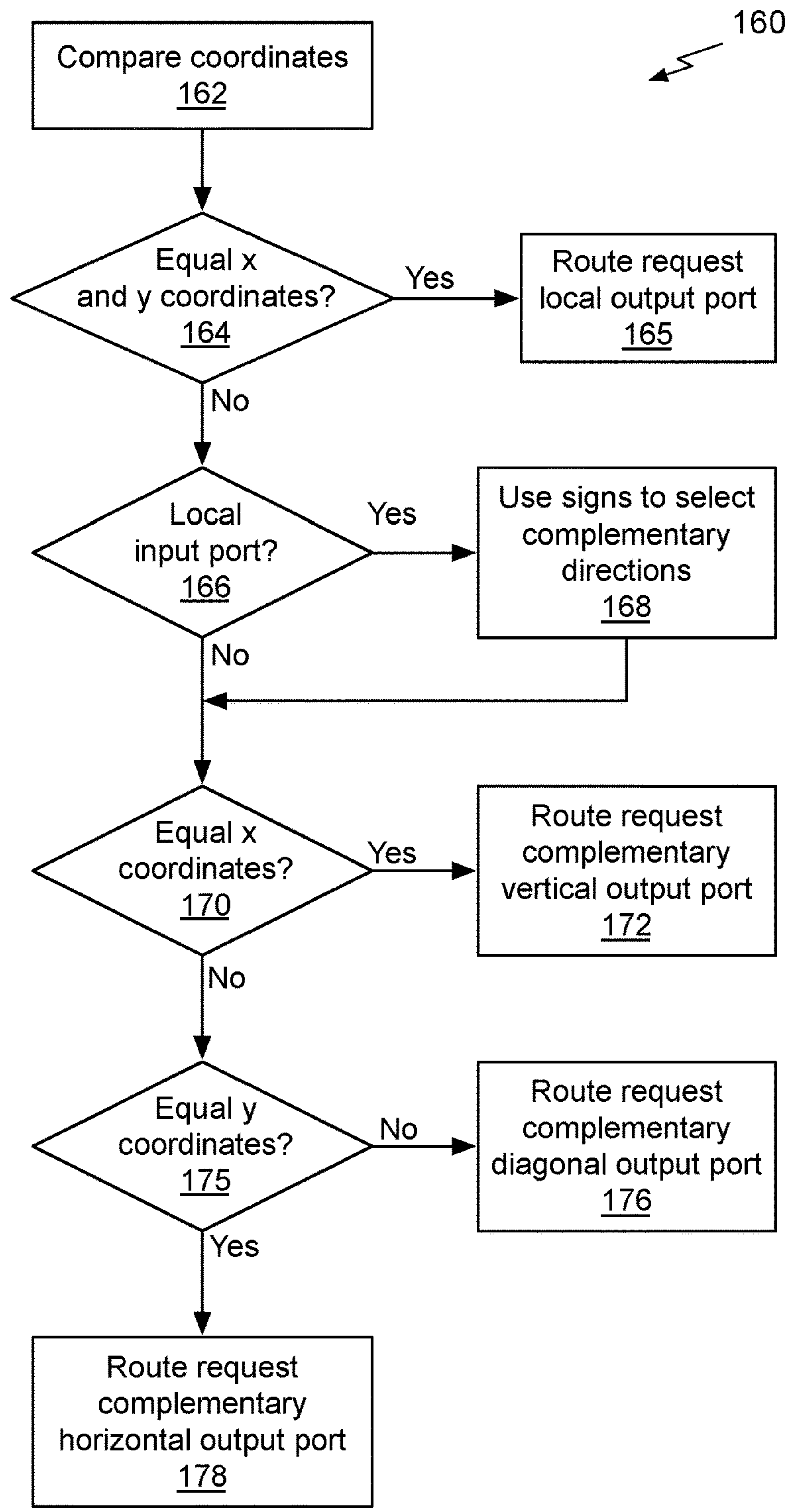
FIG. 1E illustrates a flowchart of a method for diagonal first routing, in accordance with an embodiment.

FIG. 1E illustrates a flowchart of a method 160 for diagonal first routing, in accordance with an embodiment. Each block of method 160, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 160 is described, by way of example, with respect to the die 120, the network nodes 100, the input ports 115, and the output ports 125. However, this method may additionally or alternatively be executed by any one system, or any combination of systems, including, but not limited to, those described herein. Furthermore, persons of ordinary skill in the art will understand that any system that performs method 160 is within the scope and spirit of embodiments of the present disclosure.

At step 162, the equality units 145 compute $x_{eq}$ and $y_{eq}$. At step 164, the route request unit 150 determines if $x_{eq}$ and $y_{eq}$ are both asserted, and if so, at step 165, a route request is generated for the local output port 125. Otherwise, at step 166, if the packet 130 is received at the local input port 115, the route request unit 150 uses the signs 135 to select complementary directions before proceeding to step 170. For example, when the signs 135 are (+,+), the complementary directions are N, NE, and E and when the signs 135 are (+,−), the complementary directions are E, SE, and S.

At step 170, the route request unit 150 determines if $x_{eq}$ is asserted. When $x_{eq}$ is asserted, at step 172 the packet 130 is routed vertically and the route request unit 150 generates a route request for the output port 125 that is vertically complementary to the input port 115 that received the packet 130. For example, a route request is generated for the N output port 125 when the packet 130 was received at the S, SW, or SE input port 115 and a route request is generated for the S output port 125 when the packet 130 was received at the N, NW, or NE input port 115. A route request is generated for the N output port 125 when the packet 130 was received at the local input port 115 and the complementary directions are N, NE, or NW.

When $x_{eq}$ is negated, at step 175 the route request unit 150 determines if $y_{eq}$ is asserted. When $y_{eq}$ is asserted, at step 178 the packet 130 is routed horizontally and the route request unit 150 generates a route request for the output port 125 that is horizontally complementary to the input port 115 that received the packet. For example, a route request is generated for the E output port 125 when the packet 130 was received at the W, SW, or NW input port 115 and a route request is generated for the W output port 125 when the packet 130 was received at the E, NE, or SE input port 115. A route request is generated for the E output port 125 when the packet 130 was received at the local input port 115 and the complementary directions are E, NE, or SE.

When $y_{eq}$ is negated, at step 176 the packet 130 is routed diagonally and the route request unit 150 generates a route request for the output port 125 that is diagonally complementary to the input port 115 that received the packet 130. For example, a route request is generated for the NE output port 125 when the packet 130 was received at the SW input port 115 and a route request is generated for the NW output port 125 when the packet 130 was received at the SE input port 115. A route request is generated for the NW output port 125 when the packet 130 was received at the local input port 115 and the complementary directions are N, NW, or W.

Figure 1F:
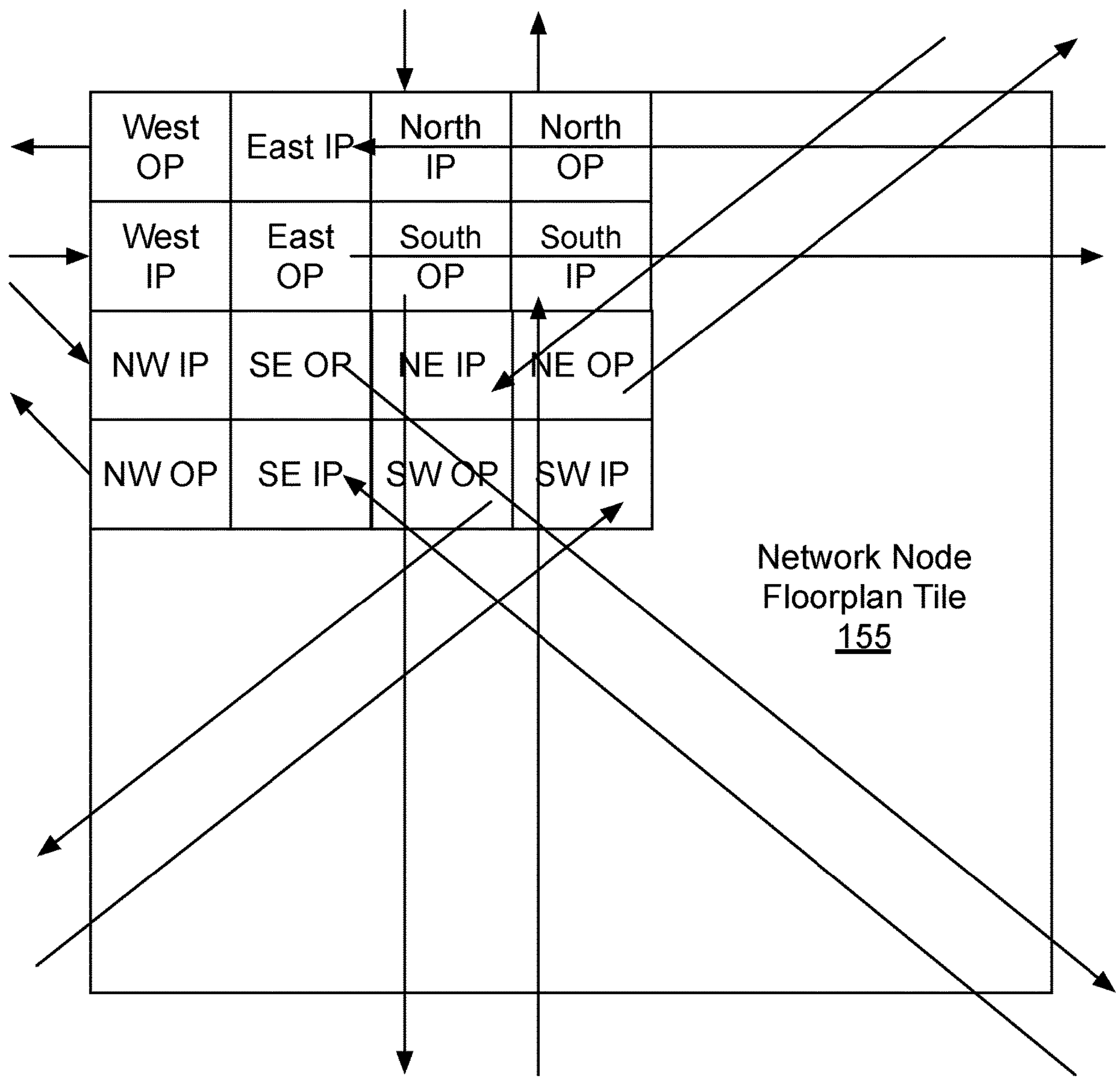
FIG. 1F illustrates a network node floorplan tile, in accordance with an embodiment.

The logic circuitry for the input ports 115 and the output ports 125 may be constrained within a limited region of each network node 100 to minimize lengths of wire traces, thereby minimizing delays incurred communicating between each input port 115 and the output ports 125 within each network node 100. FIG. 1F illustrates a network node floorplan tile 155, in accordance with an embodiment. The network node floorplan tile 155 includes circuit layout footprints for each input port 115 and output port 125. Specifically, output ports 125 (OP) for west, east, north, south, NW (northwest), SE (southeast), NE (northeast), and SW (southwest) are shown in FIG. 1F. The input ports 115 (IP) for west, east, north, south, NW (northwest), SE (southeast), NE (northeast), and SW (southwest) are also shown in FIG. 1F. In an embodiment, placement of the local input port 115 and the local output port 125 is not constrained to a specific location. In an embodiment, the local input port 115 is coupled to each one of the output ports 125 and the local output port 125 is coupled to each one of the input ports 115. Traces to/from the input ports 115 and the output ports 125 to the edges of the network node floorplan tile 155 are long and repeaters may be inserted as needed. Overall, in an embodiment, eight communication channels (N, S, E, W, NE, SW, NW, SE) are routed on four different layers. With N and S on a first layer, E and W on a second layer, NE and SW on a third layer, and NW and SE on a fourth layer. While preferably two metal layers would be devoted to diagonal routing in orthogonal directions, many of the advantages of the diagonal connections between the network nodes 100, such as the reduction in router delay (hops) and energy, can be realized by routing the diagonal connections in a stairstep or zig-zag pattern, alternating between horizontal and vertical traces. When a zig-zag pattern is used, the advantage of reduced channel delay and energy resulting from shorter wire lengths is sacrificed. Overall, the latency and energy of an on-chip network may be reduced by about 40% for diagonal traffic and about 20% on average.

The diagonal, east, and west input ports 115 and output ports 125 are arranged along the upper end of the west edge of the network node floorplan tile 155. The north and south input ports 115 and output ports 125 are along the west end of the north edge of network node floorplan tile 155. The arrangement consolidates the control logic for the input ports 115 and output ports 125 in a small area so wire delays for the control logic are short. In contrast, locating the east input port 115 and output port 125 on the east edge of the network node floorplan tile 155 would result in much longer wires and larger delays.

In one embodiment, the network node floorplan tile 155 also includes circuit layouts for a processing unit, cache, memory, and the like. For example, the processing unit may comprise a graphics processing unit (GPU) streaming multiprocessor (SM). In another embodiment, the processing unit may comprise a central processing unit (CPU). In an embodiment, the local memory circuitry may include any hardware utilized to store digital data.

Asynchronous On-Chip Network

Conventional routers within network nodes are synchronous, taking from 1-10 clock cycles to determine an output port, arbitrate between virtual and physical channels, and account for credits. In contrast, in an embodiment, transmission of the packet 130 between network nodes 100 often occurs in less than one clock cycle because the handshake protocol and the circuitry are not synchronized using a clock signal. In particular, the four-phase handshake protocol using the request and acknowledge signals does not require a clock signal or synchronous logic.

When implemented using asynchronous logic, the input port 115 and output port 125 may reduce the routing delay to just ten FO4 (fanout of 4) gate delays, approximately 100 ps. The channel latency is the minimum time needed to drive the physical traces. Such an asynchronous NoC may reduce latency by a factor of two or more compared with a synchronous NoC. The network nodes 100 may be arranged in a two-dimensional array with each network node coupled to neighboring network nodes 100 vertically and horizontally, with or without diagonal connections. Without diagonal connections, each network node 100 has five input ports 115 and five output ports 125 (east, west, north, south, and local). In an embodiment, neighboring network nodes 100 are also coupled diagonally, so that each network node has nine input ports and nine output ports. When each network node 100 has five input ports 115 and five output ports 125, it is not necessary to route each input port 115 to every one of the output ports 125. For example, a routing algorithm may prioritize routing in either the horizontal or vertical direction. Therefore, each output port 125 receives route requests from at least two of the input ports 115.

Figure 2A:
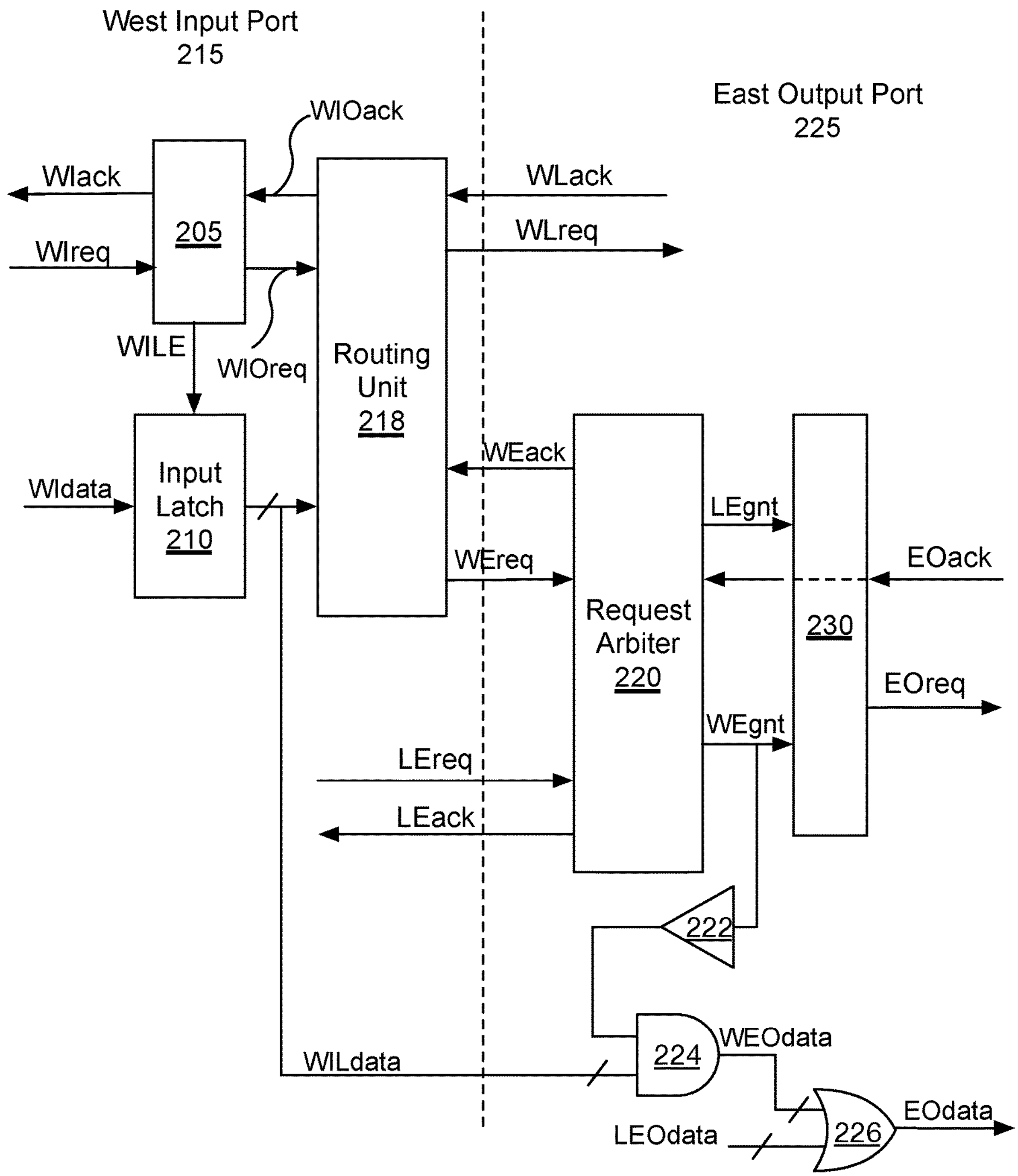
FIG. 2A illustrates an exemplary asynchronous west input port and east output port, in accordance with an embodiment.

FIG. 2A illustrates an exemplary asynchronous west input port 215 and east output port 225, in accordance with an embodiment. In an embodiment, the west input port 215 and east output port 225 comprise the input port 115 and output port 125, respectively. In an embodiment, the input port 115 comprises an input control unit 205 and routing unit 218. In an embodiment, the routing unit 218 comprises the equality units 145 and route request unit 150 of FIG. 1D. The east output port 225 comprises a request arbiter 220, and output control unit 230. In an embodiment, as shown in FIG. 2A, the west input port 215 also includes an input latch 210, enabling a quick assertion of the acknowledge signal when no transmission is pending (quick return) and the packet is accepted. In an embodiment, the packet is accepted when it is stored within the network node 100, such as in the input latch 210 and/or the packet no longer needs to be held (driven) at the data input to the input port 215, such as WIdata for the west input port 215. In an embodiment, a transmission is considered to be pending while the route request signal (WEreq) output by the west input port 215 and input to the east output port 225 is asserted. WILdata is the data associated with the route request signal. In an embodiment, the transmission is considered to be pending while WEreq is asserted and the route acknowledge signal (WEack) output by the east output port 225 is negated (i.e., while WEreq is asserted and before WEack is asserted). In an embodiment, no transmission is pending while the route request signal (WEreq) and WEack are both negated.

In an embodiment, the west input port 215 receives an asynchronous west input request (WIreq), data, and a destination address. In an embodiment, WIdata comprises a packet and WIreq comprises a request valid input (input req signal) indicating that the associated WIdata is valid. In an embodiment, the packet comprises the data 140, and the destination address and includes at least x 131 and y 132. While the request valid input is asserted, the data is routed to one output port of a plurality of output ports according to the destination address. In an embodiment, the data is routed to one of the output ports listed in TABLE 2. As shown in FIG. 2A, the west input port 215 can route the packet to either a local output port 125 (not shown) or the east output port 225. The west input port 215 asynchronously asserts a route request input (WEreq) to the east output port 225, and in response to determining that the packet is accepted, the west input port 215 asserts the acknowledge output (WIack).

In an embodiment, the east output port 225 receives route request inputs from at least two input ports of the plurality of input ports. In an embodiment, the east output port 225 receives route request inputs from the input ports listed in TABLE 1. As shown in FIG. 2A, the output port 225 can receive route requests from either a local input port 115 (not shown) or the west input port 215.

The asynchronous arbiter 220 in the east output port 225 arbitrates between competing requests and grants the east output port 225 to at most one request. When one of the requests, WEreq or LEreq, arrives before the other, it is granted the east output port 225 and the corresponding grant signal, WEgnt or LEgnt, is asserted. The grant signals gate the corresponding input data (packet) onto wires WEOdata and LEOdata, respectively, and either WEOdata or LEOdata is then output as EOdata. For example, WEgnt gates WILdata onto EOdata. If WEreq and LEreq are asserted at exactly the same time the arbiter will pick one of the two request inputs and assert the corresponding grant. In this case the request arbiter 220 may hang in a metastable state causing the request to grant delay to be arbitrarily long. However, because the probability of being in the metastable state for a long time is vanishingly small, the average delay of the request arbiter 220 is just a few FO4 gate delays.

The east output port 225, selects the data and the destination address provided by one of the at least two input ports for which the route request input is asserted as selected data and selected destination address. For example, when WEreq is asserted by the west input port 215, the east output port 225 may select the data and destination address (WILdata) as the selected data and selected destination address (EOdata). The east output port 225 asynchronously asserts an output signal (EOreq) comprising the output req signal or output request valid. Assertion of EOreq indicates that the selected data and the selected destination address (header) are valid. In response to assertion of an acknowledge input (EOack), the east output port 225 negates the output request valid (EOreq) and asserts a route acknowledge output (WEack) indicating acceptance of the route request input (WEreq) to the west input port 215.

The input control unit 205 terminates the handshake protocol and controls (enables opening and closing of) the input latch 210. The input latch 210 is open (passing WIdata through to WILdata) while WILE is asserted and holds or stores WIdata as WILdata while WILE is negated and the input latch 210 is closed. In an embodiment, WIOreq is inverted to provide WILE. In an embodiment, the input control unit 205 comprises a C-element. In other words, the input control unit 205 negates both WIack and WIOreq when both WIreq and WIOack are negated, asserts both WIack and WIOreq when both WIreq and WIOack are asserted, and when WIack and WIOreq are different, retains the state of WIreq and WIOack.

When the input latch 210 is included in the input port 115, a more complex version of the input control unit 205 allows a "quick return" in which a second input request can arrive at the west input port 215 before the WIOack (or WEack) is asserted. A delay for the more complex version of the input control unit 205 is one FO4. FIG. 2C illustrates a flowchart for a "quick return" version of the input control unit 205.

The routing unit 218 receives a west input req signal (WIOreq), the destination coordinates ($x_d$, $y_d$), and the destination direction ($x_s$, $y_s$) and determines an output port associated with an output direction. When diagonal first routing is used, the west input port 215 only routes to the east and local output ports. In an embodiment, when diagonal connections are not provided, the west input port 215 routes to the east, north, south, and local output ports and logic equations used by the west input port 215 to determine an output direction are:

$$east = x_d \neq x_c$$

$$north = (x_d = x_c) \wedge (y_d \neq y_c) \wedge y_s$$

$$south = (x_d = x_c) \wedge (y_d \neq y_c) \wedge \sim y_s$$

$$local = (x_d = x_c) \wedge (y_d = y_c)$$

The logic equations consist of two parallel equality compares to constants $x_c$ and $y_c$ (two parallel n-input AND gates for an n-bit coordinate) and a few AND gates, resulting in two or three FO4 delays. In an embodiment, the output direction signals are ANDed with the west input req signal (WIOreq) generated by the input control unit 205 to generate per-direction route request signals, such as WEreq and the local route req (WLreq). In other embodiments, the per-direction route request signals also include route request signals (WNreq and WSreq) for the north and south output ports, respectively. The routing unit 218 also ORs the acknowledges (WEack, WNack, WSack, WLack) received from the output ports to generate an output acknowledge (WIOack) to the input control unit 205.

The request arbiter 220 receives the WEreq and route requests from other input ports, such as the local input port (LEreq). As shown in FIG. 2A, for the east output port 225, the request arbiter 220 is a two-input asynchronous arbiter that receives route request inputs from the local input port (LEreq) and the west input port 215 (WEreq) and generates grants by asserting LEgnt and WEgnt, respectively. In an embodiment, the request arbiter 220 comprises an asynchronous set-reset latch with “excluded middle” circuitry at the output to avoid asserting multiple grant signals, incurring one FO4 delay. In an embodiment, the north and south output ports each require four-input arbiters (incurring two FO4 delays). In an embodiment, the request arbiter 220 receives the output acknowledge (EOack) input which is ANDed with each grant signal to steer acknowledge signals (WEack and LEack) to the appropriate input port 215.

The output of the request arbiter 220 controls a data path generating the output packet. As shown in FIG. 2A, the west-to-east grant signal (WEgnt) selectively enables the west input latch data (WILdata) onto the east output data (EOdata). Note that the data paths are multiple bits, so that a AND gate 224 and OR gate 226 are actually multiple gates, one for each data bit. Therefore, a buffer 222 should be sized according to the fanout to provide enough drive strength to generate WEOdata. In an embodiment, the buffer 222 comprises successively higher drive buffers coupled in series to drive multiple grant signals that select one packet for output by a multiplexer. In an embodiment, a minimum sized buffer drives multiple larger buffers that provide separate outputs to different bits of the AND gate 224. If WILdata is 64B wide, the fanout of the WEgnt signal is 512. Assuming a control sized 2×, the fanout for a grant signal is four FO4s.

In an embodiment, the output unit 230 ORs together the two grant signals (LEgnt and WEgnt) to form the output request (EOreq). Therefore, the output unit 230 incurs a delay of FO4 in parallel with the buffer 222, AND 224, and OR 226 to drive the output request (EOreq and EOdata). Additional delay may be added to the EOreq signal so that the output packet EOdata is valid before EOreq is asserted. An example accumulated delay from the WIreq propagating through the input control unit 205, the routing unit 218, and the request arbiter 220 to the WEgnt signal is shown in TABLE 3.

TABLE 3 accumulated delay from in input request to an output request.

| Unit | Delay (FO4) |
|---|---|
| 205 | 1 |
| 218 | 3 |
| 220 | 2 |
| Fanout | 4 |
| TOTAL | 10 |

The WEgnt signal incurs a delay of six FO4 at the output of the request arbiter 220 and then incurs an additional delay of four FO4 to reach the output EOdata. In a modem process, a FO4 is about 10 ps, so the total delay is about 100 ps.

The routing delay incurred by the routing unit 218 can be reduced to one FO4 by source routing with a dedicated multi-bit vector per hop, where the multi-bit vector includes one bit for each possible output port. The packet is constructed with a multi-bit vector for each hop of a route path through a subset of the network nodes 100. The routing unit 218 extracts the dedicated multi-bit vector from the packet's header and the header is shifted to discard the extracted multi-bit vector, leaving another multi-bit vector for the next hop. However, the header length may be longer than is practical to make the reduction in delay worthwhile. In an embodiment, the fanout term may be reduced to three or two FO4 by upsizing the input control unit 205, routing unit 218, and request arbiter 220 logic 8× or 32×. Combining the upsized logic and using the dedicated multi-bit vector, the total delay may be reduced to six FO4.

Figure 2B:
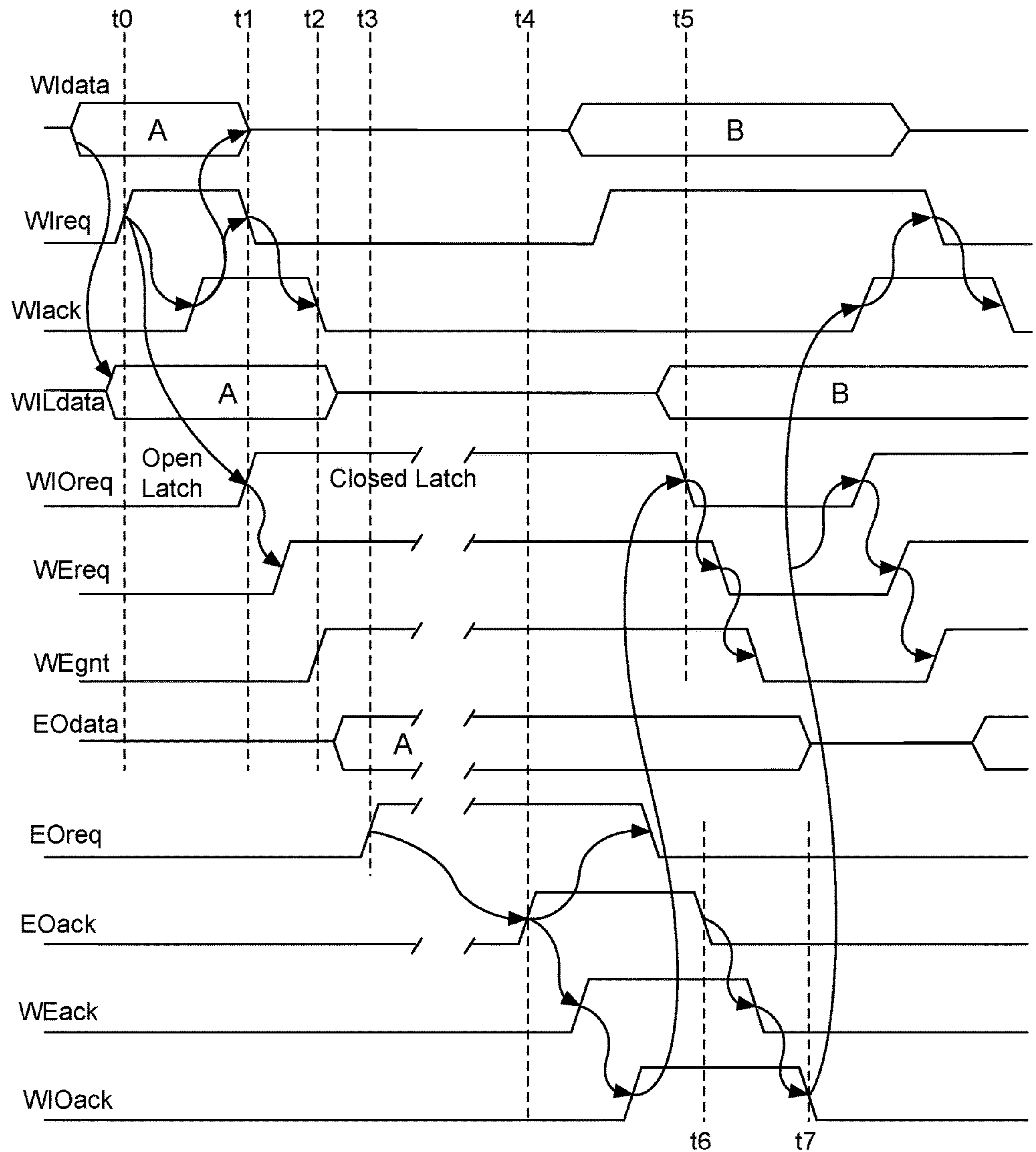
FIG. 2B illustrates a timing diagram for the west input port and east output port of FIG. 2A, in accordance with an embodiment.
Figure 2C:
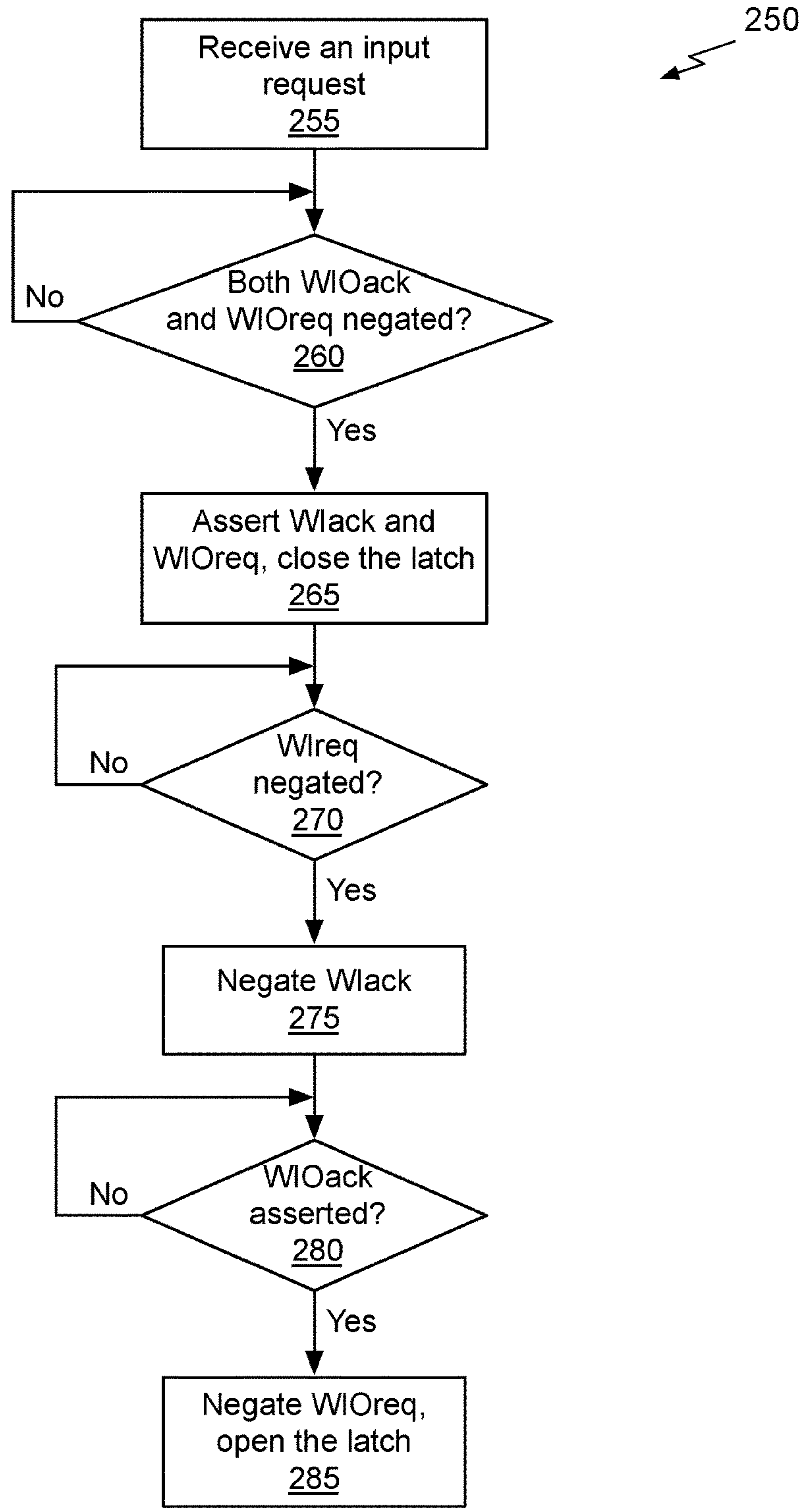
FIG. 2C illustrates a flowchart of a method for quick return of an acknowledgement, in accordance with an embodiment.

FIG. 2B illustrates a timing diagram for the west input port 215 and east output port 225 of FIG. 2A, in accordance with an embodiment. Example waveforms are illustrated for transmitting one packet from the west input port 215 to the east output port 225 of a network node 100. First, a data packet, A, including the routing header (destination address) is placed in parallel on the west input data lines WIdata. In a preferred embodiment there are 32B (256b) of data in parallel with an 8b routing header with the destination address containing destination direction, signs 135, and destination coordinates x 131 and y 132 (3 bits each). Because the input latch 210 is open before t0, the data on WIdata propagates immediately to the west input latched data WILdata. When the data and routing header is stable on WIdata, the west input request WIreq is asserted at t0. Because WIOack and WIOreq are both negated, the quick return logic responds to WIreq being asserted by asserting WIack and WIOreq. Since WIOreq is also the inverted latch enable (WILE), WIdata is latched into the input latch 210. Because the input request has been acknowledged by the assertion of WIack, the output port driving (source) of WIreq is then free to negate WIreq at t1. The quick return logic will lower WIack in response to negation of WIreq. At t2, the source is free to put the next data packet, B, on WIdata and assert the input request WIreq. However, the new input request will not be acknowledged by the west input port 215 asserting WIack until a transmission is no longer pending, meaning that the east output port 225 has acknowledged acceptance of packet A by asserting WEreq.

Meanwhile, at t1 the west input output request signal WIOreq is asserted and the destination address portion of the latched data signal WILdata are input to the routing unit 218. The routing unit 218 compares the current coordinates $x_c$, $y_c$ with the destination coordinates $x_d$ 131 and $y_d$ 132, and with the aid of the signs 135 computes a route request. As shown in FIG. 2B, the route request is for the east output port 225 and the west to east request signal WEreq is asserted by the routing unit 218 in response to assertion of WIOreq.

The west-to-east request signal WEreq is input to the request arbiter 220 in the east output port 225 and when asserted, WEreq competes with route requests from other input ports. When the route request for WEreq eventually wins the arbitration, the west-to-east grant signal WEgnt is asserted by the request arbiter 220. Assertion of WEgnt at t2 enables the west input latched data WILdata to drive the east output data EOdata, transmitting the packet to the next network node 100 to the east. Assertion of the grant signal WEgnt also drives the output unit 230 to generate an output request by asserting the east output request EOreq. Timing of the output unit 230 is arranged so that the data A is stable on EOdata before EOreq is asserted. Note that the EOreq and EOdata outputs of the network node 100 are connected to the WIreq and WIdata inputs of the next network node 100 to the east.

At t3 all of the events stemming from initial assertion of WIreq have completed and the current network node 100 is waiting for an acknowledgement, indicated by assertion of EOack by the eastward network node 100. Because the acknowledge response may involve a round trip over relatively long wires assertion of EOack at t4 may take a considerable amount of time (hundreds of picoseconds). The delay is denoted by the breaks in the waveforms between t3 and t4. The delay does not impact latency of the NoC. Signals propagate forward with only a small combinational delay. The acknowledgement delay affects only the throughput of the network node 100. The acknowledgement delay can be reduced, and throughput increased, if needed, by inserting a latch with a quick return circuit in the acknowledgement signal path.

When the acknowledge signal EOack eventually is asserted at t4 (signaling that the downstream network node 100 has accepted and latched data A) EOack is propagated back through the east output port 225 to the west input port 215, resetting the network node 100 state to accept the next data packet B. The request arbiter 220 receives the acknowledge EOack and routes an acknowledge to the requesting input port, asserting the west-to-east acknowledge signal WEack. The routing unit 218 then passes WEack to the input control unit 205 by asserting WIOack. Assertion of WIOack acknowledgement causes the quick return logic to negate WIOreq and open the input latch 210. The downstream network node 100 has accepted the data, so the data packet A no longer needs to be stored in the input latch 210.

The falling edge of WIOreq at t5 needs to propagate through WEreq and WEgnt (releasing the request arbiter 220 for another route request to potentially claim the east output port 225). At the output unit 230, EOack is negated at t6 and propagated back through the east output port 225, negating WOack (not shown) and WEack, finally propagating back through the routing unit 218 to negate WIOack. When WIOack is negated, the new input packet B is acknowledged by WIack, the input latch 210 was opened at t5 by negation of WIOreq in response to assertion of WIOack. In response to negation of WIOack at t7, WIack is asserted by the input control unit 205 to acknowledge the route request for B and is generated by the input control unit 205 asserting WIOreq and the subsequent assertion of WEreq by the routing unit 218.

FIG. 2C illustrates a flowchart of a method 250 for quick return of an acknowledgement, in accordance with an embodiment. Each block of method 250, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 250 is described, by way of example, with respect to the die 120, the network nodes 100, the input ports 115, the output ports 125, and the input control unit 205. However, this method may additionally or alternatively be executed by any one system, or any combination of systems, including, but not limited to, those described herein. Furthermore, persons of ordinary skill in the art will understand that any system that performs method 250 is within the scope and spirit of embodiments of the present disclosure.

The upstream network node 100 that is transmitting a packet should not need to wait for assertion of the output acknowledge (WIOack) by the routing unit 218 to provide the next packet. As soon as the packet is latched by the input latch 210 and the input req signal (WIreq) is negated, the input acknowledge (WIack) can be negated and the next input request can be made while waiting on assertion of the output acknowledge WIOack. The quick return logic is most easily described in terms of set-reset equations for the two output variables—WIack and WIOreq. Note that WIOreq is also the inverted latch enable WILE.

At step 225, the input control unit 205 receives an input request. The input request comprises a packet and WIreq is asserted to indicate that the request is valid. At step 260, the input control unit 205 determines if both WIOack and WIOreq are negated, meaning that no transmission is pending. If a transmission is pending, the input control unit 205 returns to step 260 to wait for the pending transmission to complete. Otherwise, at step 265, the input control unit 205 asserts WIack and WIOreq, closing the input latch 210 and storing the packet. At step 265, the input request is acknowledged without waiting for assertion of the output acknowledge (WIOack) by the routing unit 218.

At step 270, the input control unit 205 determines if WIreq is negated, and if not, step 270 is repeated. When WIreq is negated by the upstream network node 100, the input control unit 205 proceeds to step 275 and negates the acknowledge signal WIack. At step 280, the input control unit 205 determines if WIOack is asserted by the routing unit 218. Step 280 is repeated if WIOack is not asserted. Otherwise, at step 285 the input control unit 205 negates the output request WIOreq to the routing unit 218 and opens the input latch 210 to receive the next packet.

Figure 2D:
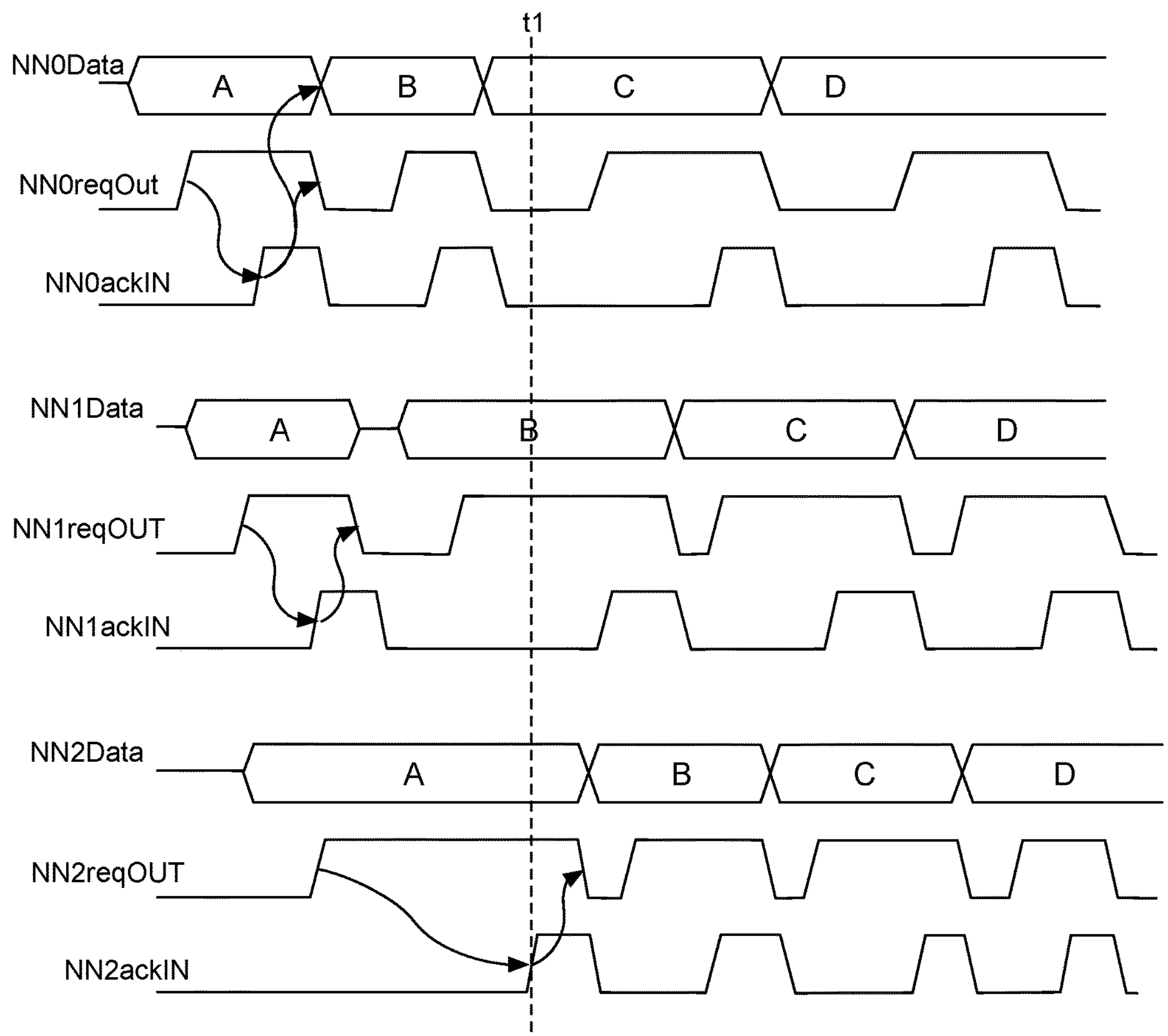
FIG. 2D illustrates a timing diagram for packets routed through multiple network nodes, in accordance with an embodiment.

FIG. 2D illustrates a timing diagram for packets routed through multiple network nodes 100, in accordance with an embodiment. The four-phase request-acknowledge flow control may be used within the network nodes 100 and when sending multiple packets through multiple network nodes 100. The waveforms illustrate the output port data, request output, and acknowledge input for first, second, and third network nodes 100 through which four packets A, B, C, and D are routed. Initially the input latches 210 of all three network nodes 100 are empty so when the first network node 100 outputs a request by asserting NNOreqOUT, the second network node 100 latches NN0Data and generates an acknowledge by asserting NN0ackIN.

The second network node 100 then outputs a request to the third network node 100 by asserting NN1reqOUT, the third network node 100 latches NN1Data and generates an acknowledge by asserting NN1ackIN. The third network node 100 outputs a request by asserting NN2reqOUT. However, the output of the third network node 100 does not receive an acknowledgement until t1, causing the third network node 100 to hold the first packet (A) and not acknowledge the second packet at the input port. Similarly, the second network node 100 holds the second packet (B), and the first network node 100 holds the third packet (C).

When the acknowledge input to the third network node 100 is finally asserted, the acknowledge propagates back through the three network nodes 100, allowing each network node 100 to advance to the subsequent packet. A similar reverse propagation occurs for each subsequent acknowledgement that is received at the output port of the third network node 100.

Referring back to FIG. 1F illustrating the network node floorplan tile 155, the east and west input ports 115 and output ports 125 are located near the upper west edge of the east and west input ports 115 and output ports 125 and are bit-sliced, so wires between the east and west input ports 115 should be short. In an embodiment, the input control unit 205, routing unit 218, request arbiter 220, and output unit 230 should be at the upper edge of the network node floorplan tile 155 with the input latch 210 and datapath gates 222, 224, and 226 below. Similarly, the north and south input ports 115 and output ports 125 should be located near the left upper edge of the network node floorplan tile 155 with the input control unit 205, routing unit 218, request arbiter 220, and output unit 230 on the left side of the north and south input ports 115 and output ports 125. Such an arrangement should ensure that the control traces are short and all data traces short except for data traces that turn corners. Examples of data traces that turn corners include west-north output data, west-south output data, east-north output data, and east-south output data. Additional examples of data traces that turn corners include diagonal inputs to either horizontal or vertical outputs, such as northwest-east data, southwest-east data, northwest-south data, northeast-south data, northeast-west data, southeast-west data, southwest-north data, and southeast-north data.

Data lines from the east and west input ports 115 and output ports 125 to the north and south input ports 115 and output ports 125, such as west-north output data need to turn a corner. For a 64B packet turning the corner requires traversing up to 512 wire pitches or about 50 μm. To allow time for the "corner turn" the corresponding control signal (west-north grant) should be delayed by a matching duration before being ORed by the output unit 230 to generate the output request (north output request). The matching duration is not additional delay in the network node 100 but is included as part of the channel delay.

Asynchronous on-Chip Network with Virtual Channels

Virtual channels can be added to the asynchronous NoC at the cost of the latency of one additional arbiter to select which virtual channel is granted access to the physical channel at each hop. In the context of the following description, assume that a complete network node 100 is duplicated for each virtual channel and each physical channel connection (vertical, horizontal, diagonal) between the different positions in the array is shared by multiplexing the data lines, OR-ing the acknowledge lines, and having separate request lines for each virtual channel. For example, when the array of network nodes 100 shown in FIG. 1A supports four virtual channels, the number of network nodes 100 is increased 4× compared with supporting no virtual channels. At each position in the array, four network nodes 100 are instantiated to support the four virtual channels. The virtual channels share the physical connections between the different array positions.

Figure 3A:
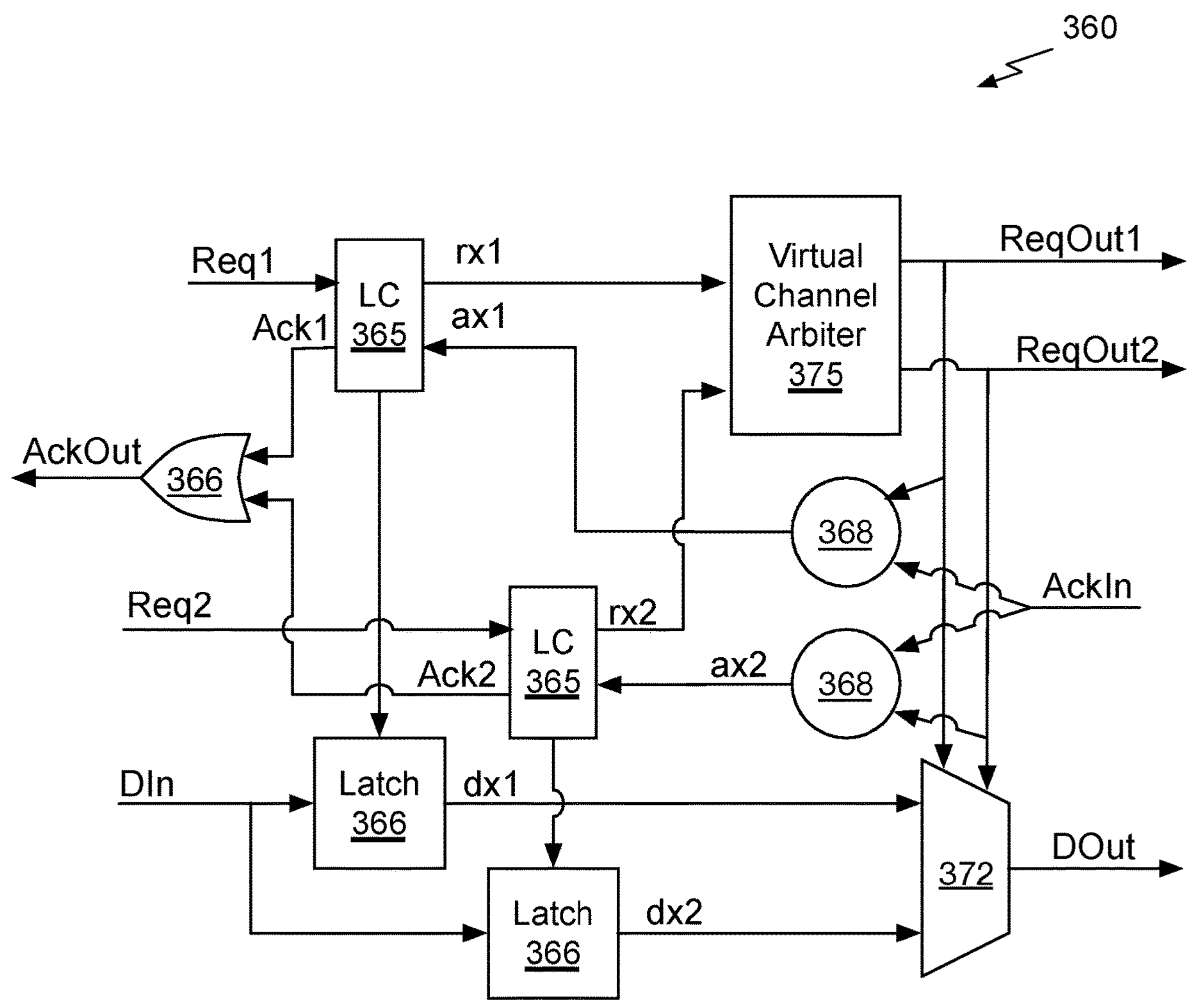
FIG. 3A illustrates exemplary logic for a virtual channel input unit that multiplexes two virtual channels onto one physical channel, in accordance with an embodiment.

FIG. 3A illustrates exemplary logic for a virtual channel input unit 360 that multiplexes two virtual channels onto one physical channel, in accordance with an embodiment. The exemplary logic is for a "null" network node where the input just passes to output. As shown in FIG. 3A, two input virtual channels have separate requests, Reg1 and Req2, but share a common acknowledge signal (AckOut) and data lines (DIn). By convention, only one of the two request lines can be asserted at any given time. The data lines are demultiplexed by two latch control blocks 365 that latch the data lines into separate input latches 366. Each one of the latch control blocks may be implemented as a C-element or quick-return logic. The common acknowledge signal (AckIn) is formed by an OR gate 366 OR-ing acknowledge signals Ack1 and Ack2 that are output by the two LC blocks 365, only one of which will be asserted at any point in time.

At each output channel of the network node 100, multiple virtual channels are multiplexed onto a single physical channel. The request lines rx1 and rx2 are provided to a virtual channel arbiter 375 to generate output requests ReqOut1 and ReqOut2, only one of which will be asserted at a given point in time. The common acknowledge signal AckIn is demultiplexed by a pair of C-elements 368. The pair of C-elements 368 steer the output acknowledge AckIn to the correct LC block 365 and hold the lines ax1 and ax2 high (asserted) until AckIn returns to zero (is negated). The data lines dx1 and dx2 output by the respective latches 366 are multiplexed by a multiplexer 372 onto output DOut under control of the winning request line (ReqOut1 or ReqOut2).

The output multiplexer 372 can be combined with the existing output multiplexers of the network node 100. Only a single request line need be amplified to fan-out to the AND-gates for each virtual channel. The multiplexer 372 can also be made hierarchical to simplify routing. For example, all virtual channels from the west input to the east output can be OR-ed together before being combined with contributions from other input ports.

The virtual channel arbiter 375 shown in FIG. 3A is downstream of any input port virtual channel arbiters that select between input ports of a given virtual channel for an output port of the virtual channel. Similar to the input port virtual channel arbiters, a new request cannot be granted until the acknowledge signal is negated (the connection from acknowledge signal to the arbiter is not shown). In an embodiment, the virtual channel and physical channel arbiters can be combined in a single arbiter tree.

Figure 3B:
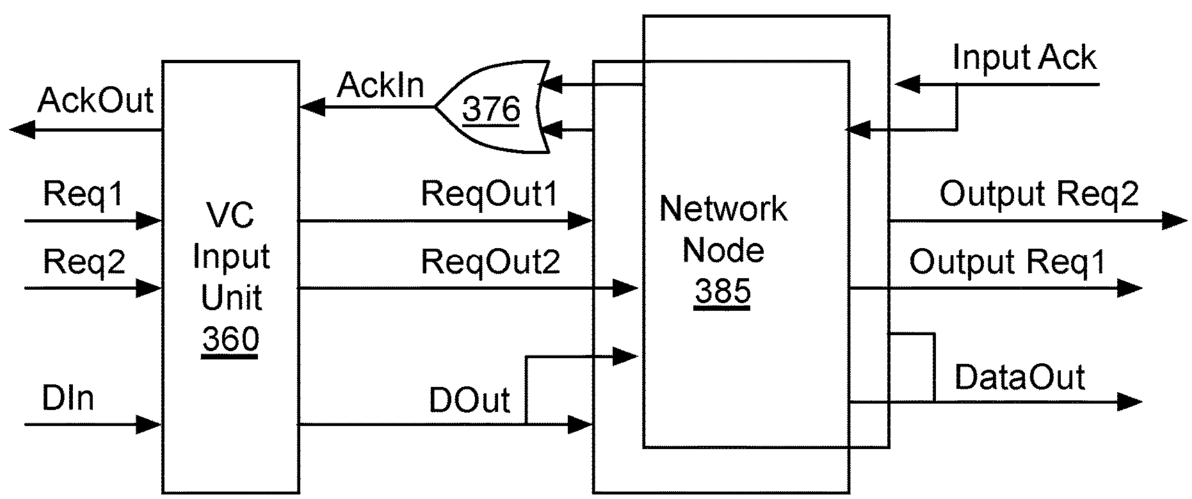
FIG. 3B illustrates the virtual channel input unit of FIG. 3A with per-channel network nodes 385, in accordance with an embodiment.

FIG. 3B illustrates the virtual channel input unit 360 of FIG. 3A with per-channel network nodes 385, in accordance with an embodiment. As previously described, a separate network node 385 is instantiated for each channel. The virtual channels share the physical connections for the data (DIn and DataOut) between the different array positions. The virtual channel input unit 360 receives the input data (DIn), per-channel requests (Req1 and Req2), and outputs the AckOut. The virtual channel input unit 360 is coupled to per-channel network nodes 385. In an embodiment, each network node 385 comprises one network node 100. The first network node 385 receives requests for a first channel via the ReqOut1 and DOut, routes the requests, and generates output requests by asserting Output Req1 and driving a packet onto DataOut. The second network node 385 receives requests for a second channel via the ReqOut2 and DOut, routes the requests, and generates output requests by asserting Output Req2 and driving a packet onto DataOut. An Input Ack is coupled to an AckOut output by another virtual channel input unit 360 and is received by the network nodes 385. Similarly, the Output Req1 and Output Req2 signals are coupled to Req1 and Req2 inputs, respectively, to another virtual input unit 360. An OR gate 376 ORs acknowledge signals output by the network nodes 385 to produce AckIn for input to the virtual channel input unit 360.

A NoC may incorporate both diagonal connections and asynchronous logic with or without virtual channels. The diagonal connections between network nodes 100 reduces energy and latency by reducing the number of hops, routing delays, and channel delays. The asynchronous logic further reduces router and channel latency.

Parallel Processing Architecture

Figure 3C:
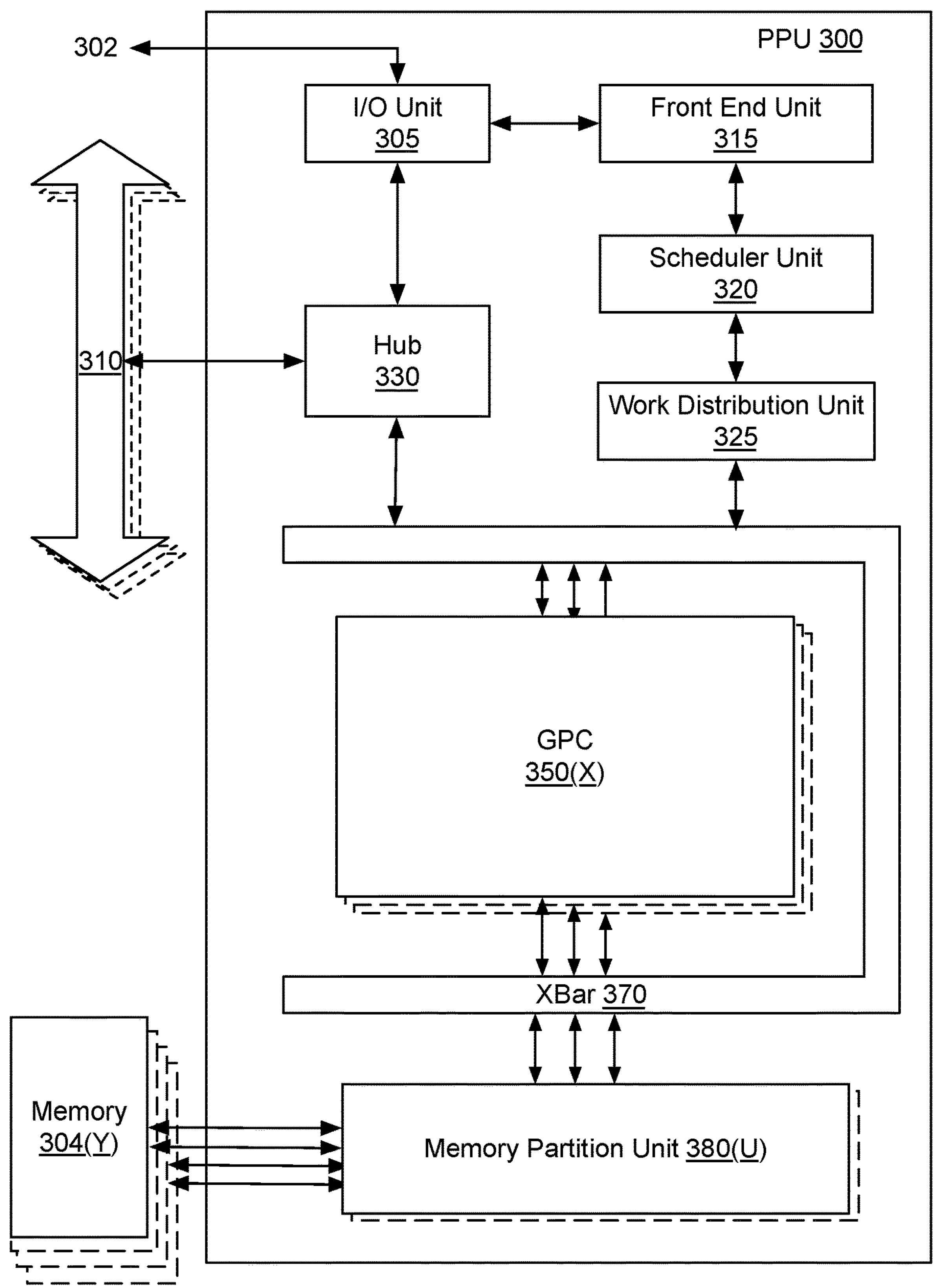
FIG. 3C illustrates an example parallel processing unit suitable for use in implementing some embodiments of the present disclosure.

FIG. 3C illustrates a parallel processing unit (PPU) 300, in accordance with an embodiment. The PPU 300 may be a client that is coupled to one or more of the network nodes 100. The PPU 300 may be used to implement the two-dimensional array of network nodes 100. In an embodiment, a processor such as the PPU 300 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, cloud computing, and machine learning applications. The PPU 300 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5A.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 4C.

Figure 4A:
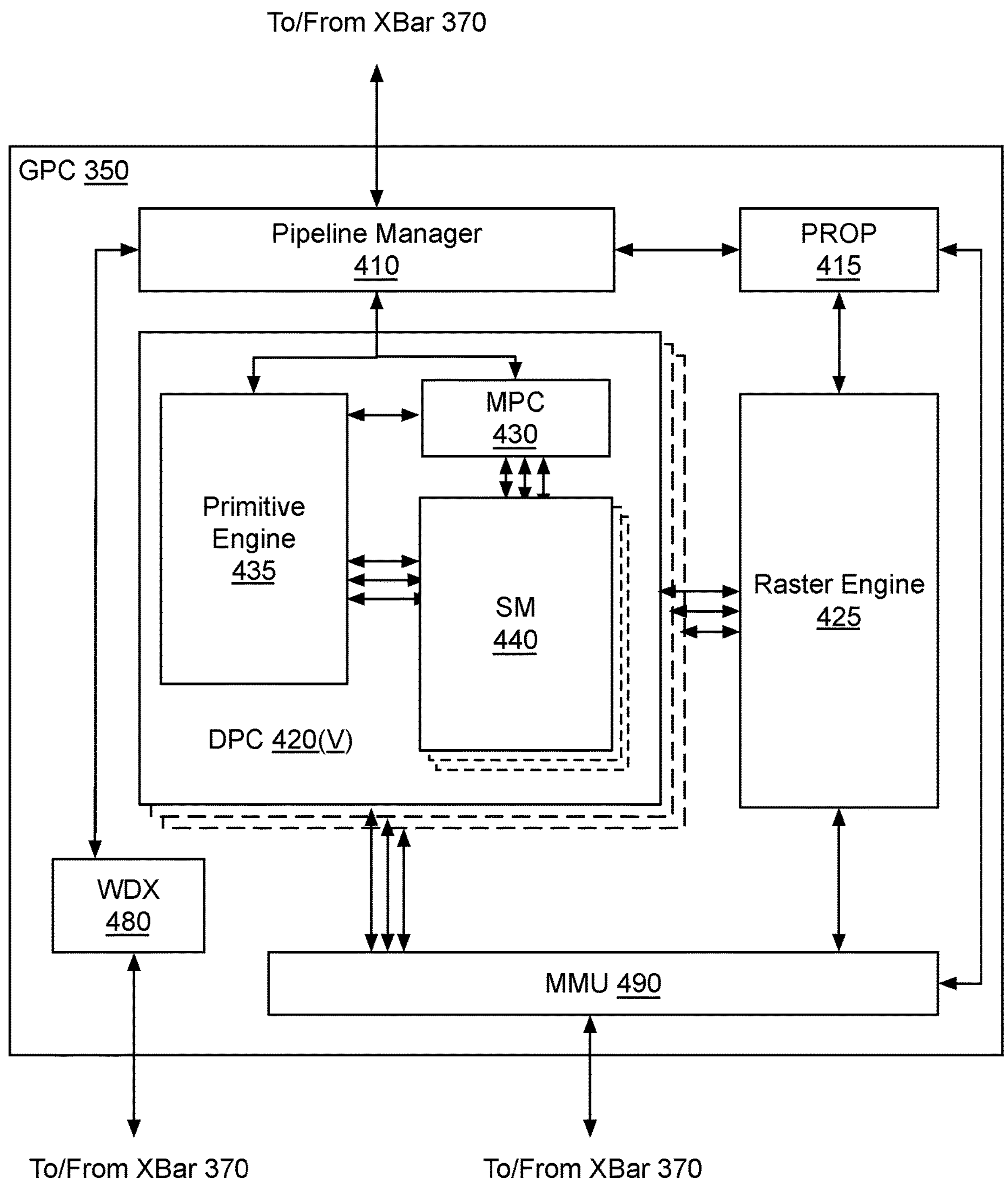
FIG. 4A illustrates an example general processing cluster within the parallel processing unit of FIG. 3C, suitable for use in implementing some embodiments of the present disclosure.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
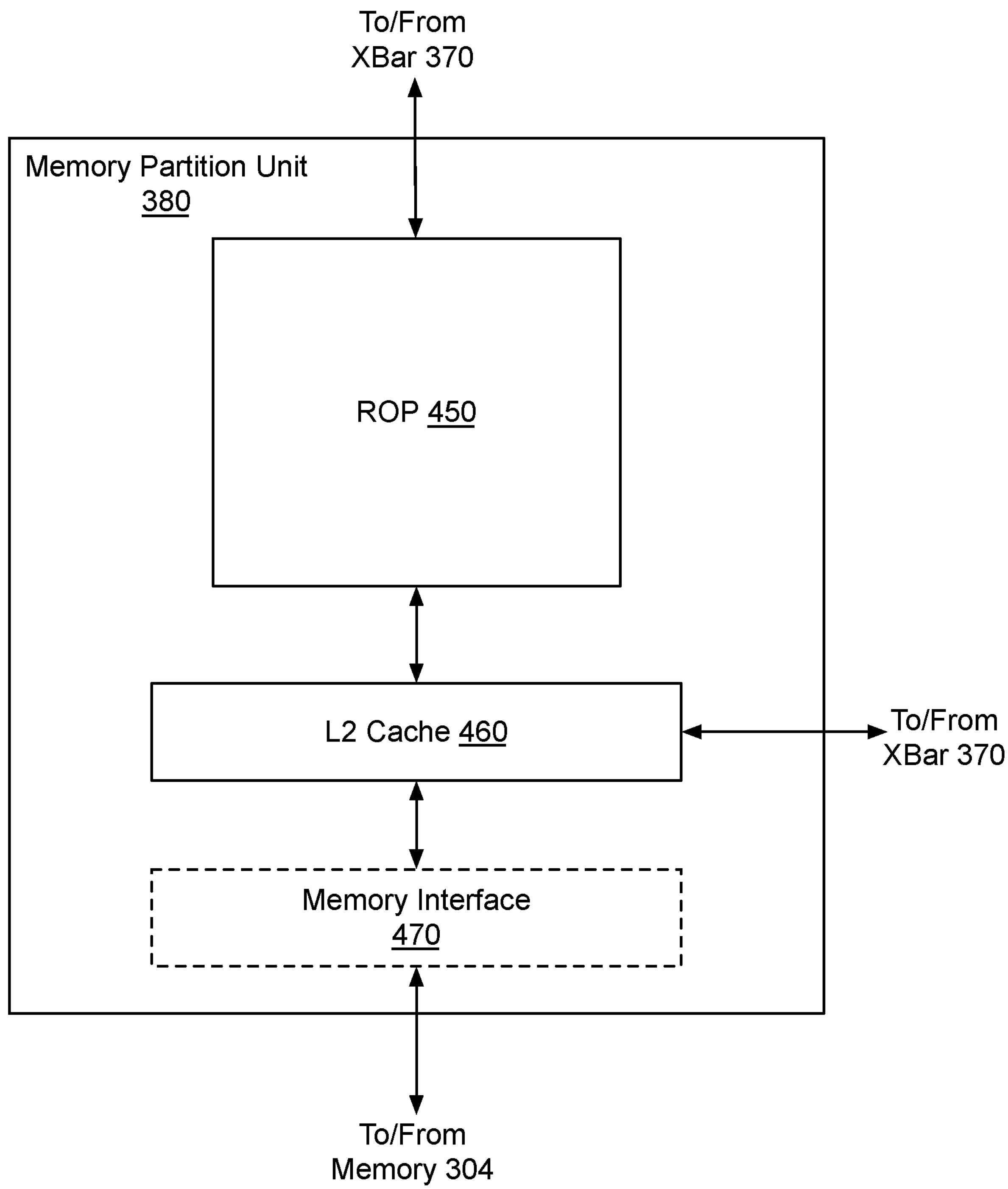
FIG. 4B illustrates an example memory partition unit of the parallel processing unit of FIG. 3C, suitable for use in implementing some embodiments of the present disclosure.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 4C.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 4C:
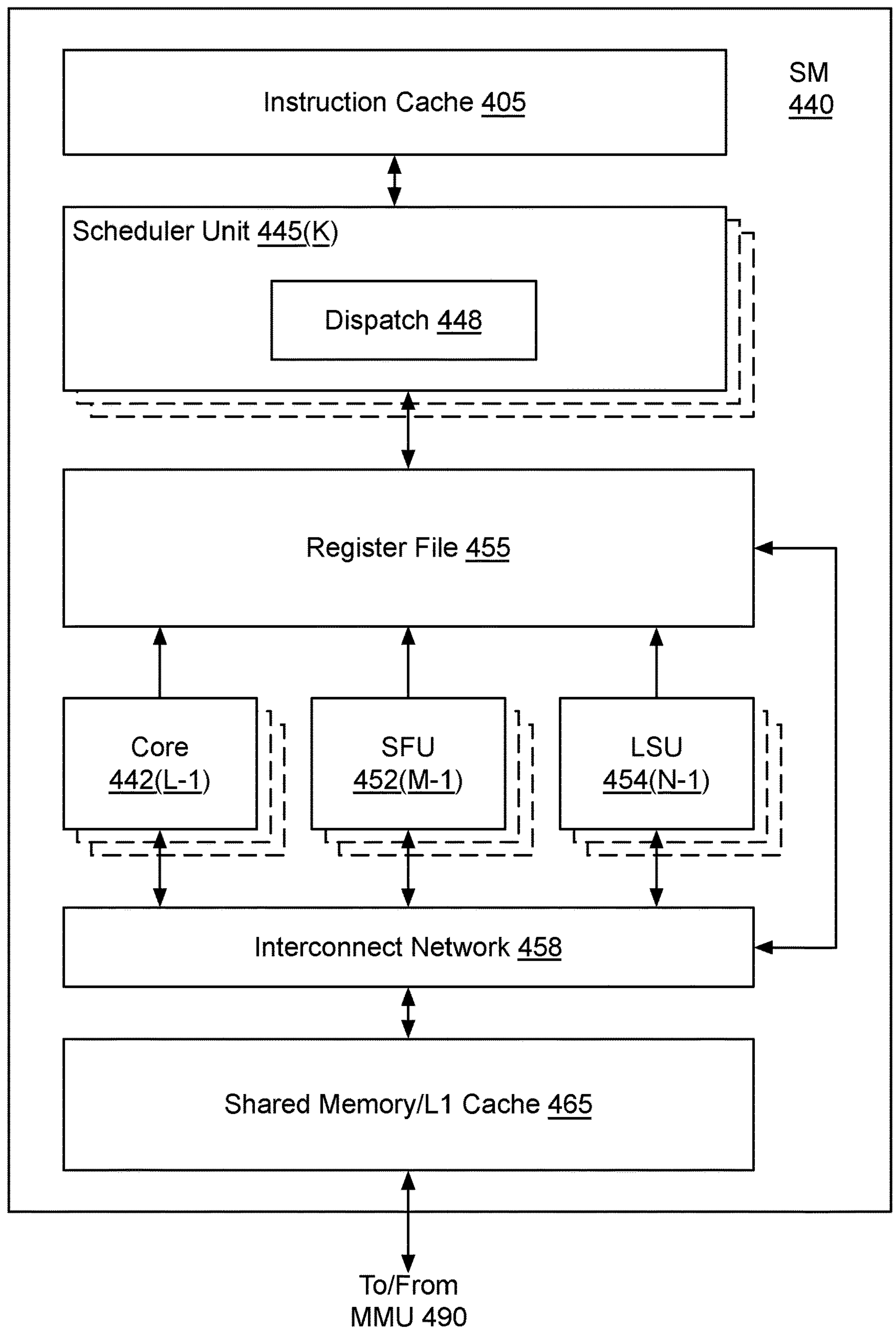
FIG. 4C illustrates an example of the streaming multiprocessor of FIG. 4A, suitable for use in implementing some embodiments of the present disclosure.

FIG. 4C illustrates the streaming multi-processor 440 of FIG. 4A, in accordance with an embodiment. As shown in FIG. 4C, the SM 440 includes an instruction cache 405, one or more (K) scheduler units 445, a register file 455, one or more processing cores 442, one or more special function units (SFUs) 452, one or more load/store units (LSUs) 454, an interconnect network 458, a shared memory/L1 cache 465.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 445 receives the tasks from the work distribution unit 325 and manages instruction scheduling for one or more thread blocks assigned to the SM 440. The scheduler unit 445 schedules thread blocks for execution as warps of parallel threads, where each thread block is allocated at least one warp. In an embodiment, each warp executes 32 threads. The scheduler unit 445 may manage a plurality of different thread blocks, allocating the warps to the different thread blocks and then dispatching instructions from the plurality of different cooperative groups to the various functional units (e.g., cores 442, SFUs 452, and LSUs 454) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 448 is configured to transmit instructions to one or more of the functional units. In the embodiment, the scheduler unit 445 includes two dispatch units 448 that enable two different instructions from the same warp to be dispatched during each clock cycle. In alternative embodiments, each scheduler unit 445 may include a single dispatch unit 448 or additional dispatch units 448.

Each SM 440 includes a register file 455 that provides a set of registers for the functional units of the SM 440. In an embodiment, the register file 455 is divided between each of the functional units such that each functional unit is allocated a dedicated portion of the register file 455. In another embodiment, the register file 455 is divided between the different warps being executed by the SM 440. The register file 455 provides temporary storage for operands connected to the data paths of the functional units.

Each SM 440 comprises L processing cores 442. In an embodiment, the SM 440 includes a large number (e.g., 128, etc.) of distinct processing cores 442. Each core 442 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 442 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 442. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 452 that perform special functions (e.g., attribute evaluation, reciprocal square root, and the like). In an embodiment, the SFUs 452 may include a tree traversal unit configured to traverse a hierarchical tree data structure. In an embodiment, the SFUs 452 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 465. The texture units implement texture operations such as filtering operations using mip-maps (e.g., texture maps of varying levels of detail). In an embodiment, each SM 340 includes two texture units.

Each SM 440 also comprises N LSUs 454 that implement load and store operations between the shared memory/L1 cache 465 and the register file 455. Each SM 440 includes an interconnect network 458 that connects each of the functional units to the register file 455 and the shared memory/L1 cache 465. In an embodiment, the interconnect network 458 is a crossbar that can be configured to connect any of the functional units to any of the registers in the register file 455 and memory locations in shared memory/L1 cache 465.

The shared memory/L1 cache 465 is an array of on-chip memory that allows for data storage and communication between the SM 440 and the primitive engine 435 and between threads in the SM 440. In an embodiment, the shared memory/L1 cache 465 comprises 128 KB of storage capacity and is in the path from the SM 440 to the memory partition unit 380. The shared memory/L1 cache 465 can be used to cache reads and writes. One or more of the shared memory/L1 cache 465, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 465 enables the shared memory/L1 cache 465 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 465 to communicate between threads, and the LSU 454 to read and write global memory through the shared memory/L1 cache 465 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
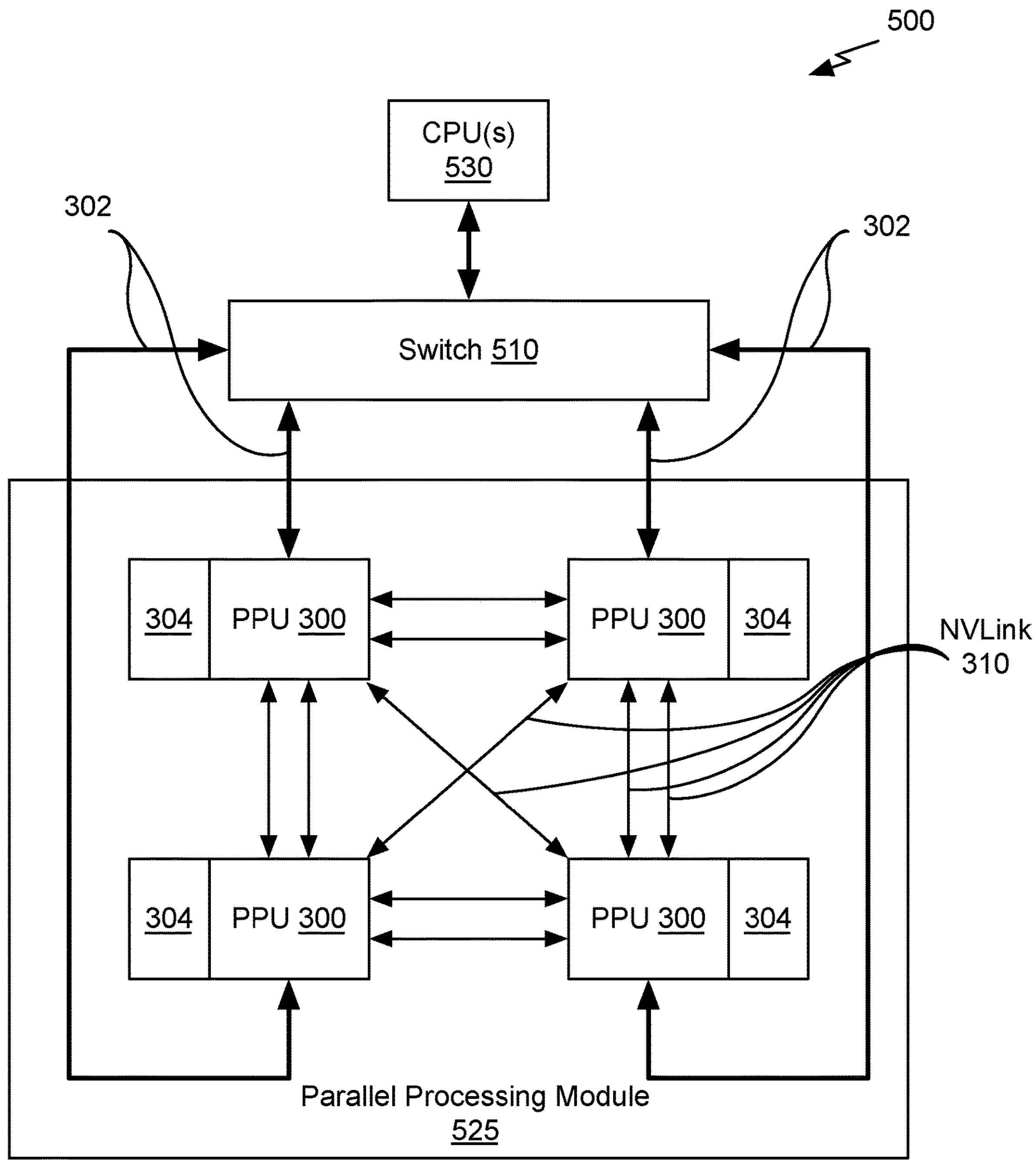
FIG. 5A is a conceptual diagram of a processing system implemented using the PPU of FIG. 3C, suitable for use in implementing some embodiments of the present disclosure.

FIG. 5A is a conceptual diagram of a processing system 500 implemented using the PPU 300 of FIG. 3C, in accordance with an embodiment. The exemplary system 500 may be configured to implement the method 160 and/or 250 shown in FIGS. 1E and 2C. The processing system 500 includes a CPU 530, switch 510, and multiple PPUs 300, and respective memories 304.

The PPUs 300 may each include, and/or be configured to perform functions of, one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The NVLink 310 provides high-speed communication links between each of the PPUs 300. Although a particular number of NVLink 310 and interconnect 302 connections are illustrated in FIG. 5A, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5A, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5A, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5B:
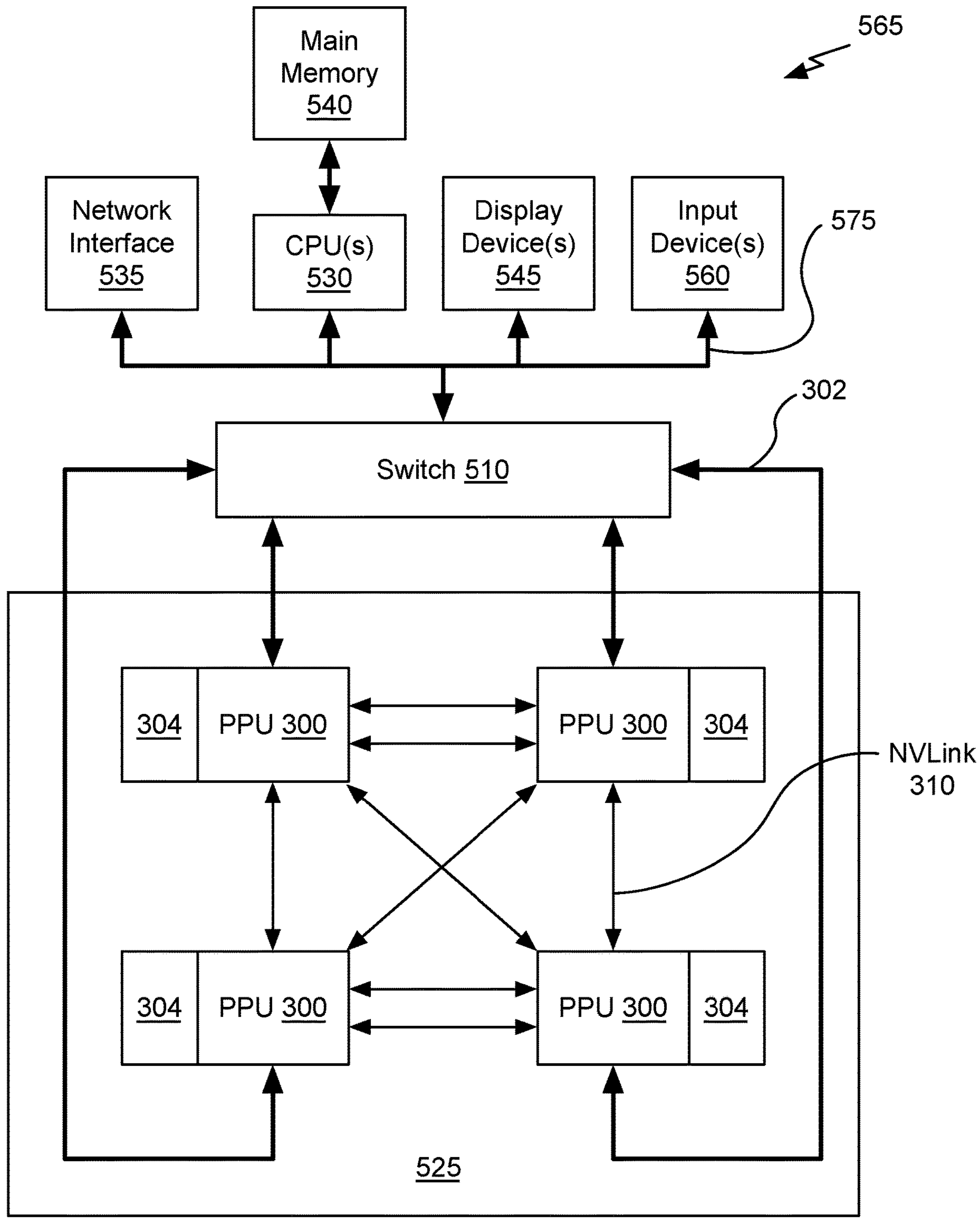
FIG. 5B illustrates an exemplary system in which the various architecture and/or functionality of the various previous embodiments may be implemented.

FIG. 5B illustrates an exemplary system 565 in which the various architecture and/or functionality of the various previous embodiments may be implemented. The exemplary system 565 may be configured to implement the method 160 and/or 250 shown in FIGS. 1E and 2C. As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron is the most basic model of a neural network. In one example, a neuron may receive one or more inputs that represent various features of an object that the neuron is being trained to recognize and classify, and each of these features is assigned a certain weight based on the importance of that feature in defining the shape of an object.

A deep neural network (DNN) model includes multiple layers of many connected nodes (e.g., neurons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
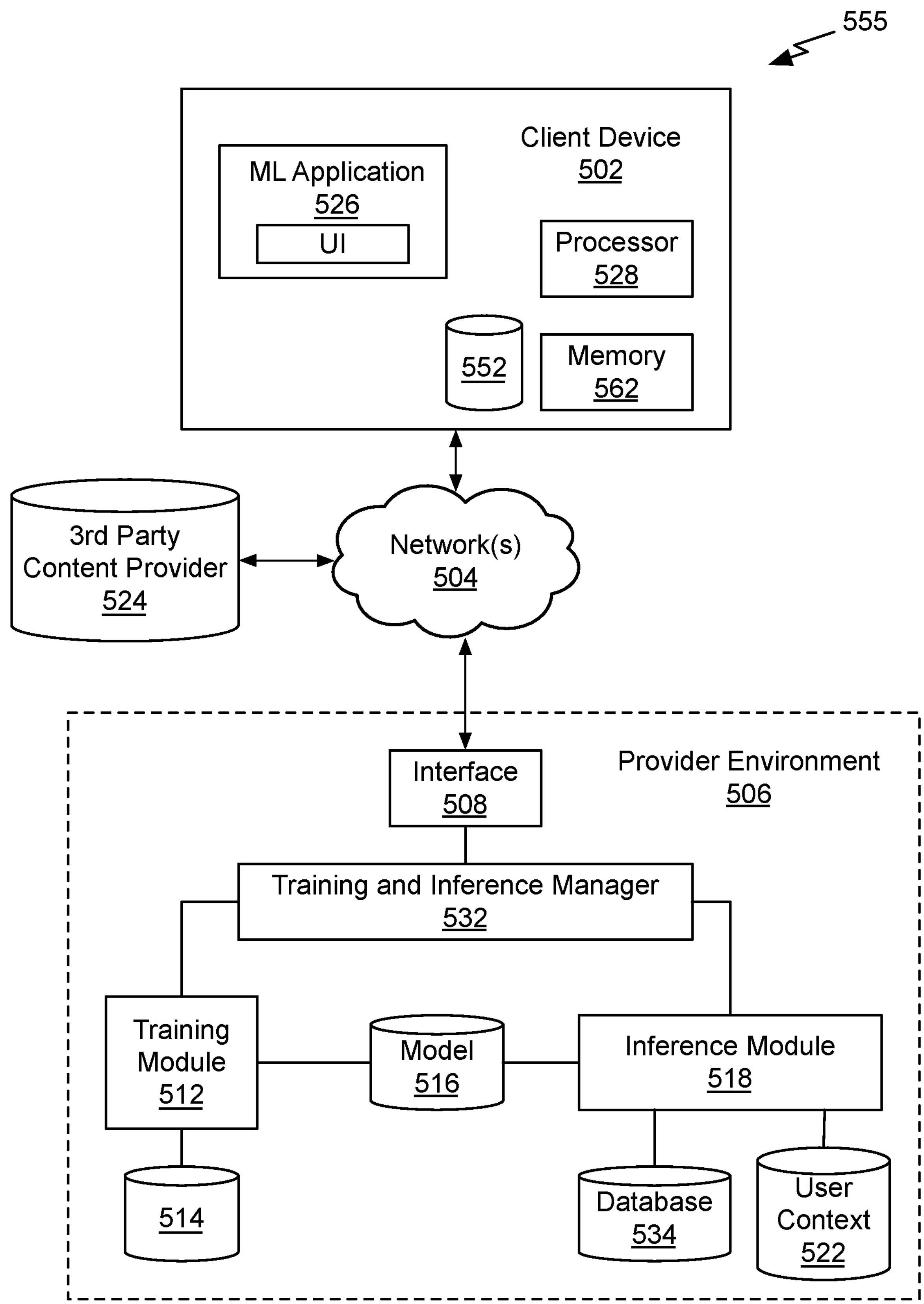
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

A graphics processing pipeline may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline utilizing the hardware of the PPU 400.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Streaming System

Figure 6:
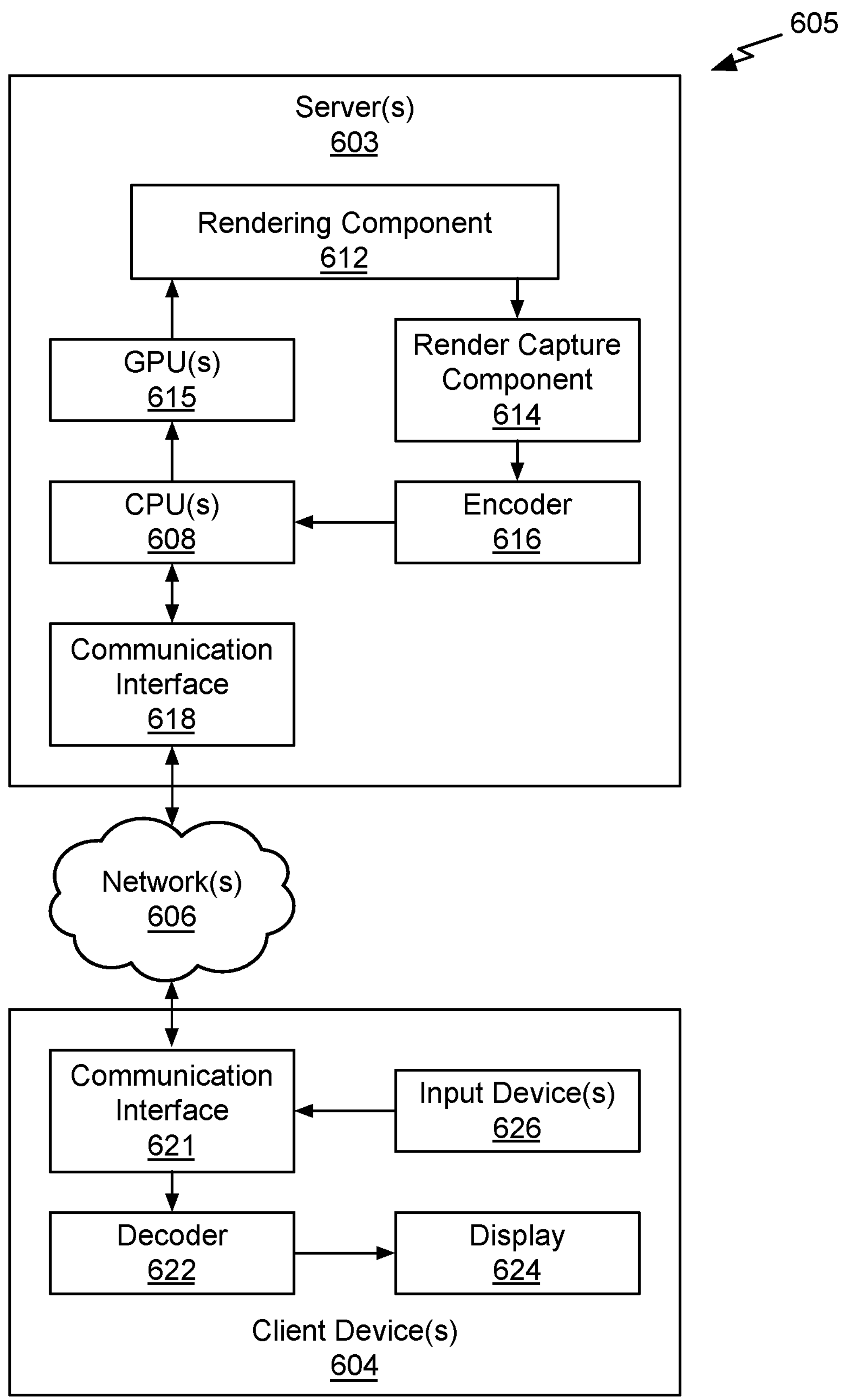
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware.

Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. An on-chip network, comprising:

a two-dimensional array of network nodes fabricated in a die, wherein each one of the network nodes comprises:

a plurality of input ports; and a plurality of output ports, each input port of the respective network node configured to:

receive an asynchronous input signal comprising a packet that includes data and a destination address, receive a request valid input signal, while the request valid input signal is asserted, route the data to a respective one output port of the plurality of output ports of the respective network node according to the destination address, asynchronously assert a route request signal input to the respective one output port for transmitting the packet, and in response to determining that the packet is accepted, assert an acknowledge output signal; and each output port configured to:

receive route request input signals from at least two input ports of the plurality of input ports of the respective network node, select the packet provided by one of the at least two input ports for which the route request signal input is asserted as a selected packet, asynchronously output an output signal comprising the selected packet;

assert an output request valid signal, and in response to assertion of an acknowledge input, negate the output request valid signal and assert a route acknowledge output signal to the one of the at least two input ports indicating acceptance of the packet for transmission.

2. The on-chip network of claim 1, wherein the packet is accepted when the route acknowledge output signal is asserted and the acknowledge output signal is negated.

3. The on-chip network of claim 1, wherein each input port comprises a latch that receives the input signal and stores the input signal in response to assertion of the acknowledge output signal.

4. The on-chip network of claim 1, wherein the packet is accepted when the route request input signal and the route acknowledge output signal are both negated.

5. The on-chip network of claim 1, wherein the request valid input signal is negated in response to assertion of the acknowledge output signal.

6. The on-chip network of claim 1, wherein each input port comprises a routing unit that receives the destination address and determines the one output port based in part on an equality comparison between the destination address and a position within the two-dimensional array of the network node receiving the asserted request valid input signal.

7. The on-chip network of claim 6, wherein the routing unit further comprises determining the one output port based in part on a horizontal sign bit and a vertical sign bit, the horizontal sign bit for a difference between a horizontal coordinate of the destination address and a horizontal coordinate associated with the position, and the vertical sign bit for a difference between a vertical coordinate of the destination address and a vertical coordinate associated with the position.

8. The on-chip network of claim 6, wherein the routing unit further comprises determining the one output port based in part on a horizontal sign bit and a vertical sign bit included in the input signal, the horizontal sign bit computed as a difference between a horizontal coordinate of the destination address and a horizontal coordinate associated with a source network node plurality of input ports that received the first packet at a local input port, and the vertical sign bit computed as a difference between a vertical coordinate of the destination address and a vertical coordinate associated with the source network node.

9. The on-chip network of claim 1, wherein each output port comprises a request arbitration unit that asserts a grant signal to select the packet and the grant signal is input to successively higher drive buffers coupled in series to drive a high-fanout signal that select the packet for output by a multiplexer.

10. The on-chip network of claim 1, wherein each one of the network nodes is fabricated within a corresponding tile of the die and circuitry for the plurality of input ports is fabricated in an upper edge region of each one of the tiles, the circuitry comprising the plurality of output ports is fabricated in a region of each one of the tiles that is below the circuitry for the plurality of input ports.

11. The on-chip network of claim 1, wherein horizontal conductive paths directly couple at least one horizontally aligned adjacent pair of the network nodes in the array for transmitting packets from an east output port to a west input port and from a west output port to an east input port of the network nodes in the horizontally aligned adjacent pair; and vertical conductive paths directly coupling at least one vertically aligned adjacent pair of the network nodes in the array for transmitting the packets from a south output port to a north input port and from a north output port to a south input port of the network nodes in the vertically aligned adjacent pair.

12. The on-chip network of claim 11, wherein a grant signal selecting the data received at either the east input port or west input port for output by either the north output port or the south output port matches a delay of traces routing the data to either the north output port or the south output port.

13. The on-chip network of claim 11, wherein the die comprises at least one of first diagonal conductive paths or second diagonal conductive paths, and the first diagonal conductive paths directly couple at least one first diagonally aligned adjacent pair of the network nodes in the array for transmitting the packets from a southeast output port to a northwest input port and from a northwest output port to a southeast input port of the network nodes in the first diagonally aligned adjacent pair and the second diagonal conductive paths directly couple at least one second diagonally aligned adjacent pair of the network nodes in the array for transmitting the packets from a southwest output port to a northeast input port and from a northeast output port to a southwest input port of the network nodes in the second diagonally aligned adjacent pair.

14. The on-chip network of claim 13, wherein the northeast input port connects only to the southwest output port, the south output port, the west output port, and a local output port and the southwest input port connects only to the northeast output port, the north output port, the east output port, and the local output port.

15. The on-chip network of claim 13, wherein the northwest input port connects only to the southeast output port, the south output port, the east output port, and a local output port and the southeast input port connects only to the northwest output port, the north output port, the west output port, and the local output port.

16. The on-chip network of claim 1, wherein virtual channels are supported by providing additional network nodes at each position in the two-dimensional array and the virtual channels share the data and acknowledge portions of the asynchronous input signal and the output signal of the network node and additional network nodes at the position.

17. The on-chip network of claim 16, wherein each position in the two-dimensional array further comprises a virtual channel arbitration unit that determines which one of the virtual channels is granted access of the shared data and acknowledge portions of asynchronous input signal and the output signal.

18. The on-chip network of claim 1, wherein the die is included in a server or in a data center.

19. The on-chip network of claim 1, wherein the die is used within a cloud computing environment.

20. The on-chip network of claim 1, wherein the packet is transmitted for training, testing, or inferencing with a neural network employed in a machine, robot, or autonomous vehicle.

21. The on-chip network of claim 1, wherein the packet is transmitted on a virtual machine comprising a portion of a graphics processing unit.

22. The on-chip network of claim 1, wherein the packet includes a set of multi-bit vectors associated with a route path through a subset of the network nodes and, each network node in the subset routes the first packet by:

extracting one of the multi-bit vectors that corresponds to the network node from the set;

routing the packet to one output port of the plurality of output ports, the one output port indicated by the extracted multi-bit vector.

23. The on-chip network of claim 1, wherein at least a portion of logic in the input port is upsized to reduce a fanout delay.

* * * * *